(12) United States Patent
Yamamoto et al.

(10) Patent No.: US 7,563,845 B2
(45) Date of Patent: Jul. 21, 2009

(54) AMINO RESIN CROSSLINKED PARTICLES AND PRODUCING PROCESS THEREOF

(75) Inventors: Yasuhiro Yamamoto, Himeji (JP); Yasuhiro Shingai, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 628 days.

(21) Appl. No.: 11/261,590

(22) Filed: Oct. 31, 2005

(65) Prior Publication Data
US 2006/0051581 A1 Mar. 9, 2006

Related U.S. Application Data

(62) Division of application No. 10/253,896, filed on Sep. 25, 2002, now Pat. No. 7,026,050.

(30) Foreign Application Priority Data
Sep. 28, 2001 (JP) ............................. 2001-304285

(51) Int. Cl.
C08L 61/00 (2006.01)
(52) U.S. Cl. .................... 524/843; 528/269; 528/499
(58) Field of Classification Search ................ 524/843; 528/269, 499
See application file for complete search history.

(56) References Cited

U.S. PATENT DOCUMENTS

| 3,428,607 A | 2/1969 | Renner |
| 3,945,980 A | 3/1976 | Tsubakimoto et al. |
| 4,069,176 A | 1/1978 | Tsubakimoto et al. |
| 4,482,699 A | 11/1984 | Williams |
| 5,049,645 A | 9/1991 | Nagaoka et al. |
| 5,288,790 A | 2/1994 | Nakahara et al. |
| 5,447,996 A | 9/1995 | Asai et al. |
| 5,597,557 A * | 1/1997 | Kumar et al. ............ 424/70.17 |
| 5,760,226 A | 6/1998 | Niessner et al. |
| 5,795,507 A | 8/1998 | Crews et al. |
| 6,610,818 B2 | 8/2003 | Yamamoto et al. |
| 7,026,050 B2 | 4/2006 | Yamamoto et al. |

FOREIGN PATENT DOCUMENTS

| JP | 50-45852 | 4/1975 |
| JP | 56-72015 | 6/1981 |
| JP | 01-207314 | 8/1989 |
| JP | 4-211450 | 8/1992 |
| JP | 7-17723 | 3/1995 |
| JP | 11-021355 | 1/1999 |

OTHER PUBLICATIONS

English translation of Japanese Office Action mailed Sep. 12, 2006.

* cited by examiner

*Primary Examiner*—Edward J Cain
(74) *Attorney, Agent, or Firm*—Nixon & Vanderhye P.C.

(57) ABSTRACT

A producing process of amino resin crosslinked particles includes the step of curing an emulsion of an amino resin precursor and an emulsifier in the presence of a catalyst, the amino resin precursor being a product of a reaction of an amino compound with formaldehyde, so as to prepare amino resin particles, the step of neutralizing the suspension of the amino resin particles after the curing step, and the step of heating the suspension in a temperature range of 130° C. to 230° C. after the neutralizing step. The amino resin crosslinked particles thus prepared by the condensation of the amino compound and formaldehyde generate formaldehyde in an amount of not more than 1000 ppm in a pyrolysis test and have a characteristic that a Hunter whiteness is not less than 85 percent.

8 Claims, 3 Drawing Sheets

EXAMPLE 1
SOLID $^{13}$C NMR CHART

COMPARATIVE EXAMPLE 1
SOLID $^{13}$C NMR CHART

EXAMPLE 4
SOLID ¹³C NMR CHART

AMINO RESIN CROSSLINKED PARTICLES AND PRODUCING PROCESS THEREOF

This application is a division of application Ser. No. 10/253,896, filed Sep. 25, 2002 now U.S. Pat. No. 7,026,050, now allowed; which claimed foreign priority benefit of JP 2001-304285, filed Sep. 28, 2001; the entire contents of which are hereby incorporated by reference in this application.

FIELD OF THE INVENTION

The present invention relates to amino resin crosslinked particles which can be suitably used, for example, in flatting agents; light diffusing agents; polishing agents; coating agents for various films; fillers that are added to polyolefin, polyvinyl chloride, various types of rubbers, paints, toners, and the like; rheology control agents; and coloring agents. The invention also relates to producing processes of such amino resin crosslinked particles.

BACKGROUND OF THE INVENTION

Conventional processes for producing amino resin crosslinked particles are disclosed, for example, in Japanese Publication for Unexamined Patent Application Nos. 57091/1974 (Tokukaisho 49-57091) (published on Jun. 3, 1974), 45852/1975 (Tokukaisho 50-45852) (published on Apr. 24, 1975), and 211450/1992 (Tokukaihei 4-211450) (published on Aug. 3, 1992). The producing processes of amino resin crosslinked particles as taught by these publications proceed as follows. First, an amino compound is allowed to react with formaldehyde to prepare an amino resin precursor. The amino resin precursor is then mixed with an aqueous solution of an emulsifier to obtain an emulsion. Thereafter, a catalyst is added to the emulsion to cure the amino resin precursor in the emulsion state and obtain a suspension of amino resin particles. Subsequently, the amino resin particles are separated from the suspension and the cake containing the resulting amino resin is heated and dried to remove water from the cake and to complete cure (condensation) of the amino resin particles. One of the problems of the producing processes of the foregoing publications is that the amino resin crosslinked particles discolor. For example, the amino resin crosslinked particles may be discolored to yellow or other colors not originally intended. In the following explanations, the term "discoloring" will be used to indicate such a phenomenon in which the amino resin crosslinked particles are discolored to yellow or other colors not originally intended.

The amino resin crosslinked particles discolor because the amino resin particles are subjected to high temperatures when the cake is heated at a temperature above 100° C., for example, in a temperature range of 130° C. to 230° C., in a heating process that is provided to remove the moisture and unreacted formaldehyde contained in the cake of amino resin particles separated from the suspension, so as to improve the efficiency of condensation of the amino resin particles. It is therefore required to set a low heating temperature of, for example, not higher than 100° C. to prevent discoloring of the amino resin crosslinked particles.

A drawback of low temperature heating (e.g., 100° C. or below) in heating the amino resin particles is that heating takes an extended period of time and removal of the moisture and free formaldehyde becomes insufficient.

Another drawback is that condensation (crosslinking) of the amino resin particles becomes insufficient, with the result that hardness, heat resistance, and solvent resistance of the product amino resin crosslinked particles degrade.

It is therefore required, in order to improve hardness, heat resistance, and solvent resistance of the amino resin crosslinked particles, to heat the amino resin particles at a temperature above 100° C. (for example, 130° C. to 230° C.). Heating the amino resin particles at such a temperature causes the problem of discoloring on the amino resin crosslinked particles.

As the catalyst (curing catalyst) used to cure the amino resin precursor, various types of acid catalysts have been used conventionally. For example, the foregoing Tokukaisho 49-57091 and Tokukaisho 50-45852 use dodecylbenzenesulfonic acid ("DBS" hereinafter) as the catalyst. One drawback of DBS is its relatively slow reaction speed, which requires higher temperature heating or a process of long time heating. Another drawback of DBS is attributed to its color, brown, which causes the color of the amino resin particles to change in the heating process of the amino resin particles. In other cases, the DBS used as the catalyst may permeate into the amino resin particles to cause plasticization and to prevent stable crosslinking.

Further, Japanese Publication for Unexamined Patent Application No. 72015/1981 (Tokukaisho 56-72015) (published on Jun. 16, 1981) uses sulfuric acid as the catalyst. The sulfuric acid has no color and does not slow the reaction speed. However, specific examples of amino resin compositions described in this publication contain paratoluene sulfonamide (PTSA) as the amino compound. Containing PTSA as the amino compound is disadvantageous in the following respect. Namely, it discourages condensation because of small numbers of crosslinking sites present between the amino compound and formaldehyde. The product amino resin crosslinked particles, as a result, have insufficient hardness and insufficient heat resistance. That is, paratoluene sulfonamide is not preferable as the amino compound where high levels of hardness and heat resistance are required for the amino resin crosslinked particles. Further, the foregoing Japanese koukai publication does not describe neutralization of acid catalyst. The conventional techniques therefore fail to produce amino resin crosslinked particles with sufficient hardness and heat resistance, and without causing discoloring upon heating.

SUMMARY OF THE INVENTION

An object of the present invention is to provide amino resin crosslinked particles which are superior in hardness, heat resistance, and solvent resistance, and which do not discolor. It is also an object of the present invention to provide producing processes of such amino resin crosslinked particles.

As the term is used herein, "amino resin particles" indicate those particles that exist as a cured emulsion of an amino resin precursor, or those particles that exist in a reaction solution in a producing step. Also, the term "amino resin crosslinked particles" will be used to refer to particles that are obtained as the final product, by separating the amino resin particles from a suspension and by carrying out a series of producing steps, such as a drying step.

After extensive research on amino resin crosslinked particles and producing processes thereof to achieve the foregoing objects, the inventors of the present invention have found that the objects can be achieved by a process that proceeds as follows. A catalyst is added to an emulsion that contains the amino resin precursor, which is obtained by a reaction of an amino compound with formaldehyde, and an emulsifier, so as to cure the amino resin precursor in an emulsion state and prepare a suspension of amino resin particles. A suspension of the amino resin particles is then adjusted within a specific pH range. The amino resin particles are finally separated from the emulsion and heated within a specific temperature range.

That is, the present invention was made based upon the finding that amino resin crosslinked particles that do not discolor under high temperature heating after curing can be obtained when an acid catalyst used for curing is neutralized (removed) by adjusting a suspension of the amino resin particles within a specific pH range before heating the amino resin particles, the suspension of the amino resin particles being obtained by curing the amino resin precursor in an emulsion state. The amino resin crosslinked particles had a structure to sufficiently resist heat and had a unique property not to discolor in a heating step, such as a drying step after curing or after production. Another property of the amino resin crosslinked particles was that the amount of residual formalin was small, owning to the fact that the amino resin crosslinked particles are sufficiently treated with heat. The amino resin crosslinked particles also had a structure that resists pyrolysis, which rendered the amino resin crosslinked particles a property of generating only a small amount of formaldehyde in a pyrolysis test. That is, the present invention is based upon a finding that a main reason for discoloring of the amino resin particles in a heating step after curing is the presence of a remaining acid catalyst that is used as a curing catalyst. The present invention, based upon this finding, solves the problem of discoloring by neutralizing the acid catalyst.

The amino resin crosslinked particles of the present invention, produced this way, is the product of condensation of an amino compound with formaldehyde, the amino resin crosslinked particles having a characteristics that an area ratio of a carbon atom signal that originates from an —NH—CH$_2$—NH— bond to a carbon atom signal that originates from an —NH—CH$_2$O—CH$_2$—NH— bond in a solid-state $^{13}$C-NMR analysis is not less than 2, and the amino resin crosslinked particles having a characteristic that a Hunter whiteness is not less than 85 percent.

Further, the amino resin crosslinked particles of the present invention, which are obtained by condensation of an amino compound with formaldehyde, generate formaldehyde in an amount of not more than 1000 ppm in a pyrolysis test, and have a characteristic that a Hunter whiteness is not less than 85 percent.

The amino resin crosslinked particles of the present invention also have a triazine ring and are formed by condensation of formaldehyde with an amino compound having a triazine ring, wherein the amino resin crosslinked particles have a characteristic that an area ratio of a carbon atom signal that originates from an —NH—CH$_2$—NH— bond to a carbon atom signal that originates from the triazine ring of the amino resin crosslinked particles in a solid-state $^{13}$C-NMR analysis is not less than 0.20.

Further, the amino resin crosslinked particles of the present invention preferably contains at least one kind of compound, in a range of 40 percent by weight to 100 percent by weight, selected from the group consisting of benzoguanamine, cyclohexanecarboguanamine, cyclohexenecarboguanamine, and melamine, and a mole ratio of the amino compound to the formaldehyde is preferably in a range of 1:1.5 to 1:3.5.

In the configuration where a Hunter whiteness is not less than 85 percent and where an area ratio of a carbon atom signal that originates from an —NH—CH$_2$—NH— bond (C(II) bond) to a carbon atom signal that originates from an —NH—CH$_2$O—CH$_2$—NH— bond (C(I) bond) in a solid-state $^{13}$C-NMR analysis is not less than 2, the proportion of the —NH—CH$_2$O—CH$_2$—NH— bond is relatively small. With this, the amino resin crosslinked particles generate only a small amount of formaldehyde when heated. Further, because of the large number of —NH—CH$_2$—NH— bonds making up the amino resin crosslinked particles, the product amino resin crosslinked particles are superior in hardness, heat resistance, and solvent resistance.

The proportion of —NH—CH$_2$O—CH$_2$—NH— bonds in amino resin crosslinked particles becomes large when the curing and condensation are insufficient because of an insufficient heat treatment. Amino resin crosslinked particles containing a large number of —NH—CH$_2$O—CH$_2$—NH— bonds easily generate formaldehyde when heated. That is, the area ratio of a carbon atom signal that originates from an —NH—CH$_2$—NH— bond to a carbon atom signal that originates from an —NH—CH$_2$O—CH$_2$—NH— bond is a measure of how small the amount of formaldehyde generated from the amino resin crosslinked particles is in the pyrolysis test and how superior the hardness, heat resistance, and solvent resistance of the amino resin crosslinked particles are. Another superior property of the amino resin crosslinked particles of the present invention is that the particles hardly discolor.

The acid catalyst is also used in the curing step when the amino resin crosslinked particles of the present invention are colored with a dye and/or a pigment. Hence, discoloring upon heating caused by a remaining acid catalyst can be limited in the same manner for colored amino resin crosslinked particles by the process of neutralizing the acid catalyst. Thus, in the case of colored amino resin crosslinked particles, a degree of discoloring upon heating is evaluated using a measure of "color difference" in a heat discoloring test. In this case, in order to achieve the foregoing objects, colored amino resin crosslinked particles, which are the product of condensation of an amino compound with formaldehyde, have a characteristic that an area ratio of a carbon atom signal that originates from an —NH—CH$_2$—NH— bond to a carbon atom signal that originates from an —NH—CH$_2$O—CH$_2$—NH— bond in a solid-state $^{13}$C-NMR analysis is not less than 2, and have a characteristic that a color difference is not more than 15 in a heat discoloring test.

Further, the colored amino resin crosslinked particles of the present invention, which are obtained by condensation of an amino compound with formaldehyde, generate formaldehyde in an amount of not more than 1000 ppm in a pyrolysis test, and have a characteristic that a color difference is not more than 15 in a heat discoloring test.

The colored amino resin crosslinked particles of the present invention also have a triazine ring and are formed by condensation of formaldehyde with an amino compound having a triazine ring, wherein the colored amino resin crosslinked particles have a characteristic that an area ratio of a carbon atom signal that originates from an —NH—CH$_2$—NH— bond to a carbon atom signal that originates from the triazine ring of the colored amino resin crosslinked particles in a solid-state $^{13}$C-NMR analysis is not less than 0.20, and wherein the colored amino resin crosslinked particles have a characteristic that a color difference is not more than 15 in a heat discoloring test.

It is preferable in the colored amino resin crosslinked particles of the present invention that the amino compound contains at least one kind of compound, in a range of 40 percent by weight to 100 percent by weight, selected from the group consisting of benzoguanamine, cyclohexanecarboguanamine, cyclohexenecarboguanamine, and melamine, and a mole ratio of the amino compound to the formaldehyde is in a range of 1:1.5 to 1:3.5.

With this configuration, the colored amino resin crosslinked particles have a characteristic that a color difference is not more than 15 in a heat discoloring test and contain a relatively small proportion of the —NH—CH$_2$O—CH$_2$—NH— bond, owning to the fact that an area ratio of a carbon atom signal that originates from an —NH—CH$_2$—NH— bond to a carbon atom signal that originates from an —NH—CH$_2$O—CH$_2$—NH— bond in a solid-state $^{13}$C-NMR analysis is not less than 2. Thus, as with the colorless amino resin crosslinked particles, the product colored amino resin crosslinked particles generate only a small amount of formaldehyde upon heating. Further, because of the large number of —NH—CH$_2$—NH— bonds making up the colored amino resin crosslinked particles, the product amino resin crosslinked particles are superior in hardness, heat resistance, and solvent resistance.

A producing process of amino resin crosslinked particles of the present invention includes the steps of (1) adding a catalyst to an emulsion of an amino resin precursor that is obtained by mixing a reaction solution containing the amino resin precursor, which is obtained by allowing an amino compound to react with formaldehyde, with an aqueous solution of an emulsifier and/or a surfactant, so as to cure the amino resin precursor in an emulsion state and obtain a suspension of amino resin particles, (2) neutralizing the suspension of the amino resin particles obtained in step (1), and (3) separating the amino resin particles from the suspension after step (2) and heating the amino resin particles in a temperature range of 130° C. to 230° C. With such a process including the neutralizing step for neutralizing the acid catalyst, the foregoing properties are rendered to the amino resin crosslinked particles and the colored amino resin particles.

The neutralizing step adjusts the suspension that contains the amino resin particles from a pH of 1.5 to 3 to a pH of not less than 5. The heating step is preferably carried out in an atmosphere of inert gas that contains oxygen in a concentration of not more than 10 percent by volume.

It is preferable in the producing process of amino resin crosslinked particles of the present invention that the step of (1) generating amino resin particles comprises a step of coloring the amino resin precursor with a dye and/or a pigment.

It is also preferable in the producing process of amino resin crosslinked particles of the present invention that the dye is a fluorescent dye and the pigment is a fluorescent pigment.

With the producing process of amino resin crosslinked particles of the present invention, by neutralizing the suspension that contains the amino resin particles after the curing step and after the step of (1) generating amino resin particles, a remaining acid catalyst can be removed. It is therefore possible to suppress discoloring of the amino resin particles in the subsequent heating step. More specifically, heating the amino resin particles in a temperature range of 130° C. to 230° C. enables water and free formaldehyde to be removed and promotes condensation. As a result, the amino resin crosslinked particles do not discolor and are superior in hardness, heat resistance, and solvent resistance, and generate only a trace amount of formaldehyde in the pyrolysis test.

In addition, by carrying out the heating step in an atmosphere of inert gas that contains oxygen in a concentration of not more than 10 percent by volume, discoloring of the amino resin crosslinked particles can be prevented even more effectively.

Further, in order to achieve the foregoing objects, the amino resin crosslinked particles of the present invention are produced by a process that includes the steps of adding a catalyst to an emulsion that is obtained by mixing an amino resin precursor, that is obtained by reacting an amino compound with formaldehyde, with an aqueous solution of a surfactant, so as to cure the amino resin precursor and obtain amino resin particles, and heating the amino resin particles in an atmosphere of inert gas that contains oxygen in a concentration of not more than 10 percent by volume and in a temperature range of 130° C. to 230° C.

Note that, as disclosed herein, the producing process that includes the step of neutralizing the acid catalyst used in the curing step in the step of producing the amino resin particles is applicable to colorless amino resin crosslinked particles, or more specifically white amino resin crosslinked particles, as well as colored amino resin crosslinked particles. As the term is used herein, "white particles" are those particles that contain no coloring agent such as a dye (including a white dye) or a pigment (including a white pigment). Therefore, the First Embodiment of the present invention describes colorless or white amino resin crosslinked particles that contain no coloring agent. The Second Embodiment describes colored amino resin crosslinked particles. It should be noted that white amino resin crosslinked particles, that are colored with a white pigment or a white dye, may be evaluated using a Hunter whiteness, as described in the First Embodiment, or using a color difference in a heat resistance test (heat discoloring test), as described in the Second Embodiment.

For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
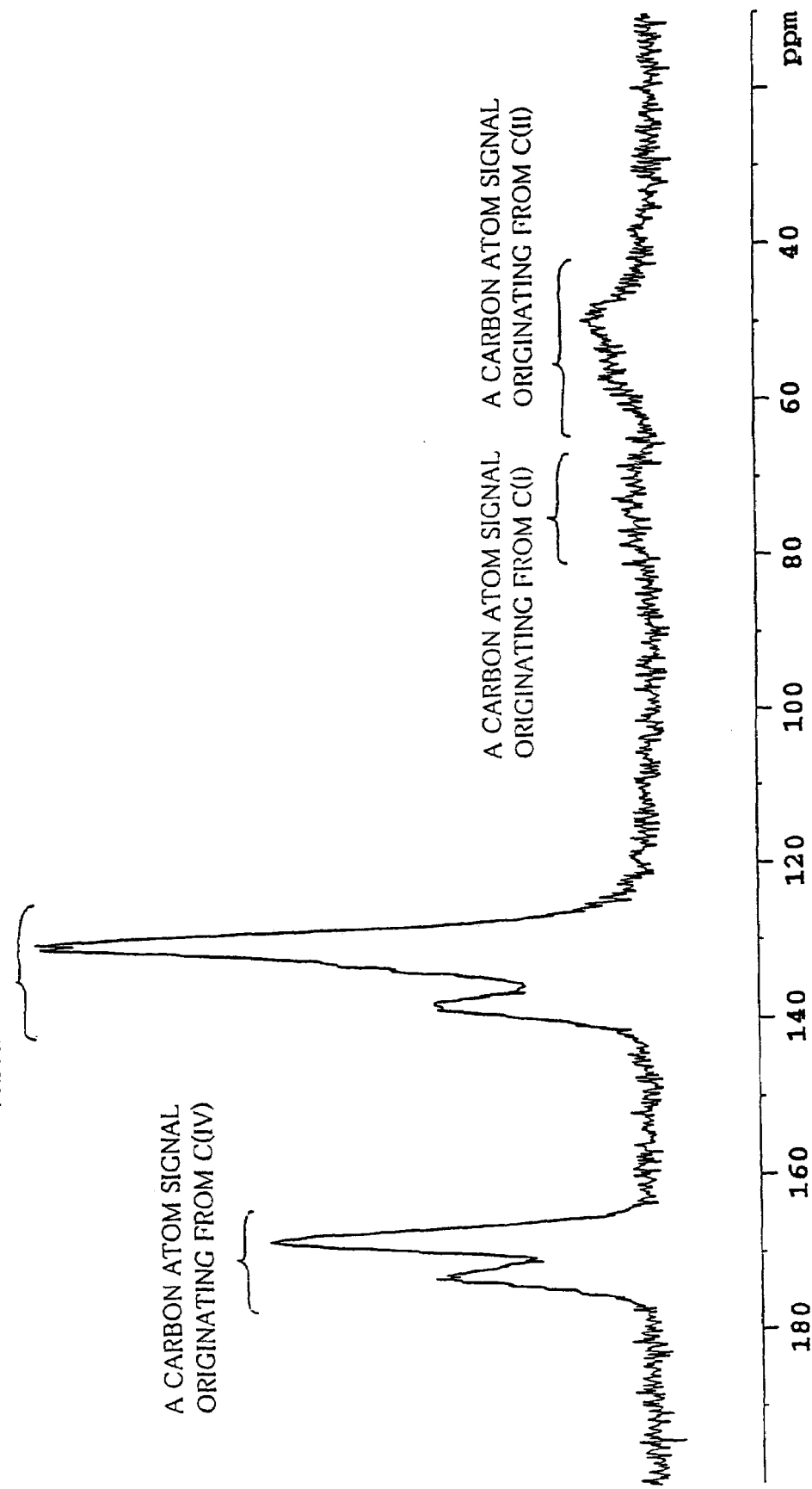
FIG. 1 is a solid-state $^{13}$C-NMR analysis spectrum of amino resin crosslinked particles of Example 1.

One embodiment of the present invention is described below. Amino resin crosslinked particles according to the present invention are produced by condensation of an amino compound with formaldehyde, wherein an area ratio of a carbon atom signal that originates from an —NH—CH$_2$—NH— bond to a carbon atom signal that originates from an —NH—CH$_2$O—CH$_2$—NH— bond in a solid-state $^{13}$C-NMR analysis is not less than 2, and wherein a Hunter whiteness is 85% or greater.

Specific examples of the amino compound used in the present invention include benzoguanamine, cyclohexanecarboguanamine, cyclohexenecarboguanamine, and melamine. Of these compounds, benzoguanamine, having a benzene ring and two reactive groups, is particularly preferable because it has ease of dyeing in the initial stage of condensation and it is superior in flexibility (hardness), stain resistance, heat resistance, solvent resistance, and chemical resistance after the compound has crosslinked. These amino compounds may be used individually or in a mixture of two or more kinds.

In either case, it is preferable that at least one kind of compound selected from the foregoing group is used in an amount of not less than 40 percent by weight and not more than 100 percent by weight. Further, the amino compound of the present invention preferably include a triazine ring. Benzoguanamine compounds are particularly preferable.

In the following, the descriptions of amino compounds based on chemical formulae will be given through the case of benzoguanamine.

Structures of amino resin crosslinked particles are described below. The amino resin crosslinked particles according to the present invention are obtained by condensation of the amino compound with formaldehyde. Heating the condensate (amino resin particles) of the amino compound and formaldehyde at a relatively low temperature (specifically, less than 130° C.) in a heating process (described later) produces amino resin crosslinked particles with a large proportion of the —NH—CH$_2$O—CH$_2$—NH— bond ("C(I) bond" hereinafter), which is created by the condensation of 1 mole of amino compound and 2 moles of formaldehyde, in their repeating structure units, as shown in Formula (1) below.

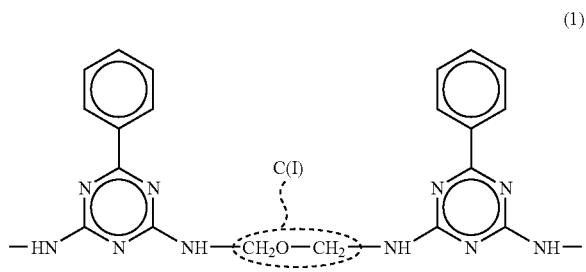

(1)

Note that, Formula (1) only shows a state of condensation of the amino compound and formaldehyde between benzoguanamine structures. That is, Formula (1) does not represent a repeating structure unit. Specifically, 1 mole of the amino compound reacts with 2 moles of formaldehyde to yield an amino compound with methylol groups. By the dehydrocondensation of the methylol groups of the amino compound, the —NH—CH$_2$O—CH$_2$—NH— bond (C(I) bond) is formed between the amino groups of the amino compound.

Heating the condensate of the amino compound and formaldehyde at a relatively high temperature (specifically, 130° C. to 230° C.) in the heating process (described later) produces amino resin crosslinked particles which include a different type of bond, as indicated by C(II) in Formula (2) below.

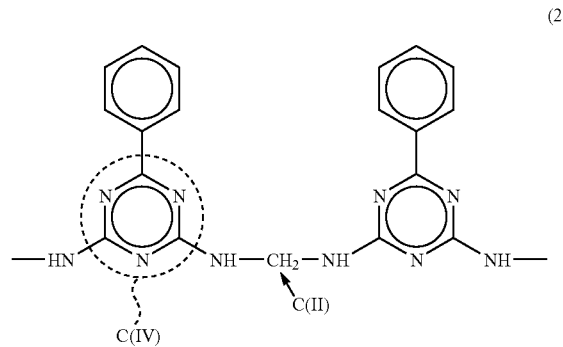

(2)

That is, amino resin crosslinked particles with a large proportion of an —NH—CH$_2$—NH— bond ("C(II) bond" hereinafter) are obtained. Note that, Formula (2) only shows a state of bonding between the compounds of benzoguanamine. That is, Formula (2) does not represent a repeating structure unit. Specifically, 1 mole of the amino compound reacts with 2 moles of formaldehyde to yield an amino compound with methylol groups. By the dehydrocondensation of the methylol groups of the amino compound, the —NH—CH$_2$O—CH$_2$—NH— bond (C(I) bond) is formed between the amino groups of the amino compounds. Eliminating formalin forms the —NH—CH$_2$—NH— bond (C(II) bond).

The proportions of the C(I) bond and the C(II) bond in the amino resin crosslinked particles change in such a way that the proportion of the C(I) bond increases as the heating temperature is decreased (100° C. and below), and conversely the proportion of the C(II) bond increases as the heating temperature is increased (130° C. and above). Where the amino resin crosslinked particles include more C(I) bonds than C(II) bonds, the amino resin crosslinked particles easily generate formaldehyde when they are heat-decomposed. In addition, heat resistance and solvent resistance of the amino resin crosslinked particles become poor. On the other hand, where the amino resin crosslinked particles include only C(II) bonds, no formaldehyde generates even when the amino resin crosslinked particles are decomposed. The relations between the proportions of the C(I) and C(II) bonds and a heating temperature vary depending on such factors as the type of amino compound, reaction conditions, and reaction steps.

According to these findings, the inventors of the present invention conducted in-depth investigation of relations between structural features of the product amino resin crosslinked particles and various properties of the particles, including heat resistance, solvent resistance, and an amount of formaldehyde generated in a pyrolysis test, for example. One feature of the amino resin crosslinked particles that was particularly closely looked into was proportions of the C(I) bond and C(II) bond in the amino resin crosslinked particles. It was found by the analysis of proportions of the C(I) bond and C(II) bond of the amino resin crosslinked particles that the relations between the structural features of the amino resin crosslinked particles and their properties, such as hardness, heat resistance, solvent resistance, and an amount of formaldehyde they generate in a pyrolysis test can be clearly defined. The proportions of the C(I) bond and C(II) bond can therefore be used as a clear index that is indicative of properties of the amino resin crosslinked particles of the present invention.

It is preferable in the amino resin crosslinked particles according to the present invention that the area ratio of a carbon atom signal that originates from the C(II) bond to a carbon atom signal that originates from the C(I) bond in a solid-state $^{13}$C-NMR analysis (NMR area ratio indicated by C(II)/C(I) in the embodiments) is not less than 2, preferably within a range of 2 to 20, or more preferably a range of 2 to 10.

The area ratio indicates a state of bonding in the amino resin crosslinked particles, i.e., a state of bonding between the amino compounds and formaldehyde making up the amino resin crosslinked particles. When the area ratio of a carbon atom signal that originates from the C(II) bond to a carbon atom signal that originates from the C(I) bond in a solid-state $^{13}$C-NMR analysis is less than 2, the hardness of the product amino resin crosslinked particles becomes weak and it degrades heat resistance and solvent resistance of the product amino resin crosslinked particles.

It is preferable in the amino resin crosslinked particles according to the present invention that formaldehyde is generated in an amount of not more than 1000 ppm, preferably not more than 500 ppm, more preferably not more than 300 ppm, even more preferably not more than 100 ppm, and most preferably not more than 50 ppm, in a measured value in a pyrolysis test. More desirably, the amount of formaldehyde generated should be less than the practical limit of detection by a detector, i.e., an undetectable amount by a detector. A generated amount of formaldehyde exceeding 1000 ppm in the pyrolysis test means the amino resin crosslinked particles have a large proportion of C(I) bonds. The hardness of the product amino resin crosslinked particles becomes weak in this case, which may degrade heat resistance and solvent resistance of the amino resin crosslinked particles. Note that, as the term is used herein, "pyrolysis test" is a test that is used to measure the generated amount of formaldehyde, by heating the amino resin crosslinked particles at 160° C.

It is preferable in the amino resin crosslinked particles according to the present invention that the area ratio in a solid-state $^{13}$C-NMR analysis of a carbon atom signal that originates from the C(II) bond to a carbon atom signal that originates from the triazine ring (C(IV) bond) of the amino compound of the amino resin crosslinked particles (NMR area ratio indicated by C(II)/C(IV) in the embodiments) is not less than 0.20, or more preferably within a range of 0.20 to 0.40. The carbon atoms that originate from the triazine ring are the three carbon atoms, as shown in Formula (2), that make up the triazine ring ("C(IV)" hereinafter). The area ratio of a carbon atom signal that originates from the C(II) bond to a carbon atom signal that originates from the C(IV) bond becomes less than 0.20 when the number of C(II) bonds is small. In this case, the proportion of the C(I) bond becomes large and the hardness of the product amino resin crosslinked particles becomes weak, which may degrade heat resistance and solvent resistance of the product amino resin crosslinked particles.

It is preferable that the amino resin crosslinked particles according to the present invention has a characteristic that a Hunter whiteness is not less than 85%, or more preferably not less than 90%. "Hunter whiteness" is a JIS standard under P8123 of the regulation ("Hunter whiteness testing method for paper and pulp"), and it is a measure of whiteness with respect to a reference color of 100% white. More specifically, Hunter whiteness is a relative reflectance of the sample irradiated with light with respect to a reference magnesium oxide board. A spectral calorimeter, for example, is used to measure Hunter whiteness. A Hunter whiteness of less than 85% is not preferable because it discolors the amino resin crosslinked particles to yellow ("discoloring" hereinafter). Note that, in the present invention, when a Hunter whiteness of the product amino resin crosslinked particles is less than 85%, the product amino resin crosslinked particles are deemed as the discolored particles.

As described, it is preferable in the amino resin crosslinked particles according to the present invention that (i) the Hunter whiteness is not less than 85% and the area ratio of a carbon atom signal that originates from the C(II) bond to a carbon atom signal that originates from the C(I) bond in a solid-state $^{13}$C-NMR analysis is not less than 2, (ii) the Hunter whiteness is not less than 85% and the amount of formaldehyde generated is not more than 1000 ppm in a measured value of a pyrolysis test, and (3) the Hunter whiteness is not less than 85% and the area ratio of a carbon atom signal that originates from the C(II) bond to a carbon atom signal that originates from the C(IV) bond in a solid-state $^{13}$C-NMR analysis is not less than 0.20.

It is also preferable, when the amino compound is benzoguanamine as shown in Formula (3) below, that the area ratio in a solid-state $^{13}$C-NMR analysis of a carbon atom signal that originates from the C(II) bond to a carbon atom signal that originates from a benzene ring ("C(III)" hereinafter) of the benzoguanamine structure (NMR area ratio indicated by C(II)/C(III) in the embodiments) is not less than 0.08, preferably within a range of 0.08 to 0.20, or more preferably 0.10 to 0.20. Note that, the C(II) bond is the —NH—CH$_2$—NH— bond.

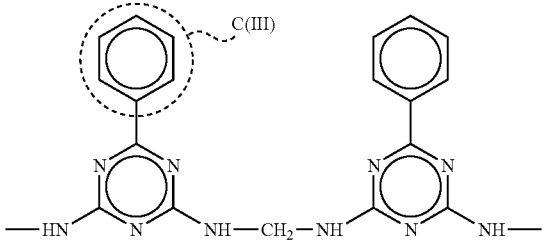

(3)

The area ratio of a carbon atom signal that originates from the C(II) bond to a carbon atom signal that originates from the C(III) bond becomes less than 0.08 when the C(I) bond and the C(II) bond coexist in the amino resin crosslinked particles. In this case, the proportion of the C(I) bond becomes large and heat resistance and solvent resistance of the product amino resin crosslinked particles may degrade.

It is preferable in the amino resin crosslinked particles according to the present invention, which is obtained by condensation of an amino compound with formaldehyde, that the mole ratio of structure units of the amino compound and formaldehyde making up the amino resin crosslinked particles is in a range of 1:1 to 1:2, and that the Hunter whiteness is not less than 85%. The structure unit of the formaldehyde may be the methylene group (specifically, the C(II) bond), as indicated in Formula (2), that results from the condensation of the amino compound and formaldehyde, or the C(I) bond, as indicated in Formula (1), that results from the condensation of the amino compound and formaldehyde. The condensation may become insufficient when the mole ratio of the structure units of the formaldehyde and the amino compound falls below 1 (the structure units of formaldehyde/the structure units of the amino compound). On the other hand, the proportion of the C(I) bond in the amino resin crosslinked particles becomes large when the mole ratio of the structure units of the amino compound and formaldehyde exceeds 2. In this case, the hardness of the product amino resin crosslinked particles becomes weak, which may lead to degradation of heat resistance and solvent resistance of the amino resin crosslinked particles.

The following describes a producing method of amino resin crosslinked particles according to the present invention. A producing process of amino resin crosslinked particles according to the present invention includes the steps of: (1) adding a catalyst to an emulsion that was obtained by mixing an amino resin precursor, which is the product of a reaction between an amino compound and formaldehyde, with an aqueous solution of an emulsifier, so as to cure the amino resin precursor to prepare amino resin particles; (2) neutralizing a suspension that contains the amino resin particles obtained in step (1); and (3) heating the amino resin particles after step (2) in a temperature range of 130° C. to 230° C. Specifically, a catalyst is added to an emulsion of an amino resin precursor that is obtained by mixing an aqueous solution of an emulsifier with a reaction solution containing the amino resin precursor that results from the reaction of the amino compound with formaldehyde. The mixture is stirred to maintain an emulsion state and the amino resin precursor is cured in the emulsion state to obtain a suspension that contains amino resin particles. Then, the suspension containing the amino resin particles in a pH range of 1.5 to 3 is adjusted in the neutralizing step, so that the pH of the suspension becomes not less than 5, or more preferably 5 to 9. The amino resin particles are then separated from the suspension and heated in. a temperature range of 130° C. to 230° C., preferably 130° C. to 210° C., or more preferably 130° C. to 190° C.

The following explanations will be given through the case where the step of preparing amino resin particles includes a reaction step, an emulsifying step, and a curing step.

In the reaction step, the amino compound is allowed to react with formaldehyde to obtain the amino resin precursor. The reaction of the amino compound with formaldehyde uses water as a solvent. Thus, formaldehyde may be added or charged in the form of an aqueous solution (formalin), or may be generated in a reaction solution by adding trioxane or paraformaldehyde to water. Preferably, formaldehyde is added in the form of an aqueous solution. The reaction step is carried out in this manner to obtain a reaction solution containing the amino resin precursor.

The mole ratio of the amino compound to formaldehyde is preferably in a range of 1:1.5 to 1:3.5, or more preferably 1:2 to 1:3.5. A proportion of formaldehyde outside these ranges is not preferable because it increases an unreacted portion of the amino compound and formaldehyde. Note that, the amount of amino compound and formaldehyde added with respect to water, i.e., the concentration of amino compound and formaldehyde when they are charged should be increased as high as possible, provided that it does not hinder the reaction. More preferably, such a concentration is chosen that the viscosity of the reaction solution containing the reactant, the amino resin precursor, in a temperature range of 95° C. to 98° C. after the reaction falls within a range of $2 \times 10^{-2}$ Pa·s to $5.5 \times 10^{-2}$ Pa·s (20 cP to 55 cP) at 95° C. to 98° C. More preferably, the concentration is such that addition of the reaction solution into the aqueous solution of the emulsifier yields 30 percent by weight to 60 percent by weight of amino resin precursor in the emulsifying step. That is, the amino resin precursor according to the present invention is the initial condensate, which is obtained by the reaction of the amino compound with formaldehyde, whose viscosity in the reaction solution in a temperature range of 95° C. to 98° C. after the reaction is $2 \times 10^{-2}$ Pa·s to $5.5 \times 10^{-2}$ Pa·s (20 cP to 55 cP) at 95° C. to 98° C.

The viscosity can be measured most suitably with use of a viscometer, so that proceedings of the reaction of the amino compound with formaldehyde can be grasped instantly (in real time) and an end point of the reaction can be accurately found. An example of such a viscometer is the vibration viscometer (product of MIVI ITS JAPAN; Model No. MIVI 6001). This viscometer is equipped with a vibrator that is constantly vibrating. When the vibrator dipped in the reaction solution experiences a load in response to increased viscosity of the reaction solution, the viscometer instantly converts the load into a viscosity for display. The vibration viscometer is also known as a process viscometer.

It is preferable that the pH of the reaction solution used to produce the amino resin precursor be adjusted to be either neutral or weakly basic, using alkaline compounds such as sodium carbonate, sodium hydroxide, potassium hydroxide, or ammonium water. The amount of the alkaline compound used should be adjusted by measuring it using a pH meter or the like, so that the pH of the emulsion containing the amino resin precursor falls in a predetermined pH range. The reaction of the amino compound with formaldehyde in water yields the amino resin precursor, which is the initial condensate. The reaction temperature should preferably be in a range of 90° C. to 98° C., or more preferably 95° C. to 98° C., so that the reaction of the amino compound with formaldehyde proceeds efficiently. The reaction step is ended in the temperature range of 95° C. to 98° C., when the viscosity of the reaction solution becomes $2 \times 10^{-2}$ Pa·s to $5.5 \times 10^{-2}$ Pa·s in the temperature range of 95° C. to 98° C., by cooling the reaction solution, for example. The product of the reaction step is a reaction solution containing the amino resin precursor. Reaction time is not particularly limited accordingly. It is preferable that the mole ratio of the structure units of the amino compound and formaldehyde, which make up the amino resin precursor obtained in the reaction step, is within a range of 1:1.5 to 1:3.5. With a mole ratio in this range, particles with a narrow particle distribution can be obtained.

Note that, the viscosity of the reaction solution at the end of the reaction is considerably higher than that of the aqueous solution (at the start of the reaction) charged with the amino compound and formaldehyde, and therefore the viscosity of the reaction solution is essentially unaffected by the concentration or other variables of the raw materials. The amino resin precursor is practically insoluble in water but soluble in organic solvents, examples of which include acetone, dioxane, methyl alcohol, ethyl alcohol, isopropyl alcohol, butyl alcohol, ethyl acetate, butyl acetate, methyl cellosolve, ethyl cellosolve, methylethyl ketone, toluene, and xylene.

The lower the viscosity of the reaction solution of the amino resin precursor, the smaller the particle size of the particles in the emulsion step. However, amino resin crosslinked particles of essentially uniform particle size (narrow particle distribution) cannot be obtained when the viscosity of the reaction solution is less than $2 \times 10^{-2}$ Pa·s or exceeds $5.5 \times 10^{-2}$ Pa·s in the temperature range of 95° C. to 98° C. Specifically, when the viscosity of the reaction solution is below $2 \times 10^{-2}$ Pa·s (20 cP), amino resin particles of essentially uniform particle size (narrow particle distribution) may not be obtained after the emulsion step and the curing step. That is, when the viscosity of the reaction solution is below $2 \times 10^{-2}$ Pa·s (20 cP), stability of the emulsion obtained in the emulsion step becomes poor. In this case, curing the amino resin precursor in the subsequent curing step often results in enlarged amino resin crosslinked particles or aggregation of particles. That is, it becomes impossible to control particle size of the amino resin particles, with the result that only amino resin crosslinked particles of non-uniform particle size and wide particle distribution may be produced. Further, the poor stability of the emulsion may cause the particle size of the amino resin particles to vary from batch to batch during production. This variation often affects in the product. On the other hand, a viscosity of the reaction solution exceeding $5.5 \times 10^{-2}$ Pa·s (55 cP) in the temperature range of 95° C. to 98° C. puts a load, for example, on a high-speed stirrer used in the emulsifying step and lowers the shearing force, with the result that the reaction solution cannot be emulsified sufficiently. In this case, it becomes impossible to control particle size of the amino resin particles, with the result that amino resin particles of non-uniform particle size and wide particle distribution are usually obtained.

In the emulsifying step, the reaction solution containing the amino resin particles is mixed with an aqueous solution of an emulsifier to emulsify, so that an emulsion of an amino resin precursor can be obtained. Emulsifiers that can be used in the aqueous solution are not particularly limited as long as protective colloids are formed. For example, polyvinyl alcohol, carboxymethyl cellulose, sodium alginate, polyacrylic acid, water-soluble polyacrylate, and polyvinyl pyrrolidone can be used. More specifically, the emulsifier is a water-soluble polymer emulsifier, or more preferably, a water-soluble polymer that can form protective colloids. The emulsifier is used in the form of an aqueous solution by being entirely dissolved in water, or by being partially dissolved in water and partially maintaining its original form (e.g., powder, granule, liquid, etc.). Among the foregoing emulsifiers, polyvinyl alcohol is preferable in terms of stability of the emulsion and interaction with the catalyst. The polyvinyl alcohol may be saponated either completely or partially. The degree of polymerization is not particularly limited either. The larger the amount of emulsifier used with respect to the amino resin precursor, the smaller the particle size of the product particles. It is preferable that the amount of emulsifier used with respect to 100 percent by weight of the amino resin precursor is in a range of 1 percent by weight to 30 percent by weight, or more preferably 1 percent by weight to 5 percent by weight. In the emulsion step, the reaction solution containing the amino resin precursor may be added to the aqueous solution of an emulsifier and/or an aqueous solution of a surfactant, provided that it does not pose any problem. Further, an emulsifier and/or an aqueous solution of a surfactant may be added to the reaction solution containing the amino resin precursor. In order to more efficiently carry out the emulsion step, the reaction solution containing the amino resin precursor may be added to an aqueous solution of an emulsifier and/or an aqueous solution of a surfactant.

In a more preferred embodiment, in the emulsifying step, the reaction solution of the amino resin precursor is added to an aqueous solution of an emulsifier, so that the concentration of the amino resin precursor (i.e., concentration of the solid component) is in a range of 30 percent by weight to 60 percent by weight. Subsequently, the reaction solution is emulsified in a temperature range of 70° C. to 100° C. The concentration of the aqueous solution of an emulsifier added is not particularly limited and such a concentration is selected that the concentration of the amino resin precursor can be adjusted within the foregoing range. The aqueous solution of the emulsifier maybe added to the reaction solution of the amino resin precursor. A method of stirring in the emulsifying step should preferably use a device that is capable of powerful stirring, so that the emulsion of the amino resin precursor can be obtained in the form of sufficiently small particles. For example, a method using a so-called high-speed stirrer or a homo mixer is preferable. When the concentration of the amino resin precursor falls below 30 percent by weight, productivity of the amino resin crosslinked particles suffers. On the other hand, when the concentration of the amino resin precursor exceeds 60 percent by weight, the product amino resin particles may enlarge or particles may aggregate. That is, it becomes impossible to control particle size of the amino resin particles, with the result that only amino resin particles of non-uniform size (wide particle distribution) are obtained. Specific examples of the high-speed stirrer or homomixer include the homomixer or TK homomixer (the product of Tokushu Kika Kogyo Co., Ltd., Japan; provided with turbine-like shaped blades), the high-speed disper, homodisper, or TK lab disper (the product of Tokushu Kika Kogyo Co., Ltd., Japan; provided with turbine-like shaped blades), the EBARA Milder (the product of Ebara manf. Co., Ltd.; provided with Sutto turbine-like shaped blades), the high-pressure homogenizer (the product of Izumi Food Machinery Co., Ltd.), and a static mixer.

In the present invention, in order to ensure that the amino resin crosslinked particles do not aggregate firmly, inorganic particles may be optionally added to the emulsion. Specific examples of inorganic particles include silica particulate, zirconia particulate, aluminum particulate, alumina sol, and ceria sol. The inorganic particles preferably has a specific surface area in a range of 5 $m^2/g$ to 400 $m^2/g$ and a particle size of no larger than 0.05 µm. These ranges of a specific surface area or a particle size are even more effective in preventing aggregation of amino resin crosslinked particles.

Specifically, the inorganic particles may be added to the emulsion, for example, either directly in the form of particles, or in the form of a dispersion in water. The amount of inorganic particles added to the emulsion is not particularly limited but a range of 1 percent by weight to 15 percent by weight with respect to 100 percent by weight of the amino resin precursor is preferable.

In the curing step, the amino resin particles (suspension containing amino resin particles) can be obtained by adding a catalyst to the emulsion of the amino resin precursor and curing the amino resin precursor in an emulsion state. The catalyst (curing catalyst) is preferably an acid. Examples of the acid include mineral acids such as hydrochloric acid, sulfuric acid (concentrated sulfuric acid), and phosphoric acid; ammonium salts of these mineral acids; sulfonic acids such as sulfamic acid, benzenesulfonic acid, paratoluene sulfonic acid, and dodecylbenzene sulfonic acid; and organic acids such as phthalic acid, benzoic acid, acetic acid, propionic acid, and salicylic acid. Of these catalysts (acids), mineral acids are preferable in terms of curing rate, and sulfuric acids are more preferable considering corrosion of the device and safety over the use of mineral acids. Using sulfuric acids rather than other acids such as dodecylbenzene sulfonic acid is preferable because they impart no color on the amino resin crosslinked particles and they provides high solvent resistance to the amino resin crosslinked particles. These catalysts may be used either individually or a combination of two or more kinds. It is preferable that the catalyst is added in an amount of 0.1 to 5 parts by weight with respect to 100 parts by weight of the amino resin precursor, or in an amount of not less than 0.002 mole, preferably not less than 0.005 mole, and more preferably 0.01 to 0.1 mole, with respect to 1 mole of the amino compound. An amount of catalyst exceeding 5 parts by weight destroys an emulsion state and causes the particles to aggregate. On the other hand, an amount of catalyst less than 0.1 part by weight extends the reaction time or results in insufficient curing.

The reaction temperature for curing the emulsion is preferably in a range of 15° C. to 100° C. An end point of the reaction can be found by sampling or by visual inspection to see if amino resin particles have formed. More preferably, the temperature of the emulsion is lowered to around room temperature before gradually increasing it to cure the emulsion of the amino resin precursor and obtain the suspension containing the amino resin particles. Specifically, a reaction time is 3 to 15 hours.

The average particle size of the amino resin particles thus obtained is preferably in a range of 0.05 µm to 30 µm, or more preferably 0.1 µm to 15 µm. With the producing process according to the present invention, the standard deviation of average particle size can be controlled within a range of not more than 6 µm, preferably not more than 4 µm, or more preferably not more than 2 µm.

In the producing process of amino resin crosslinked particles according to the present invention, after the condensation and curing of the amino resin precursor to prepare amino resin particles, a suspension of the amino resin particles is neutralized (neutralizing step). The neutralizing step removes the acid catalyst remaining in the suspension. More specifically, by neutralizing the acid catalyst, discoloring of the amino resin crosslinked particles after the heating step can be suppressed. As the term is used herein, "neutralize" in the present invention means adjusting the pH of the suspension, which is in a range of 1.5 to 3 after the curing catalyst is added and the amino resin precursor is cured, to a pH of not less than 5, or more preferably 5 to 9. The pH of the suspension is adjusted in this range by measuring it using a pH meter or the like.

When the pH of the suspension is less than 5, the acid catalyst remains. This is not preferable because it imparts color to the amino resin crosslinked particles in a later heating step. That is, by adjusting the pH of the suspension to be not less than 5, or more preferably in a range of 5 to 9, it is possible to obtain amino resin crosslinked particles with high degree of hardness and superior solvent resistance and superior heat resistance, without discoloring. As a neutralizer for neutralizing the suspension, alkaline compounds are preferable. Examples of alkaline compounds include sodium carbonate, sodium hydroxide, potassium hydroxide, and ammonia. Among these alkaline compounds, sodium hydroxide is preferable in terms of ease of handling, and an aqueous solution of sodium hydroxide is suitably used.

The amino resin crosslinked particles can be extracted from the suspension (reaction solution) by any separation method (separation step). A filtration method or a method using a separator such as centrifugal separator can be conveniently used. Note that, the amino resin crosslinked particles extracted from the suspension may be optionally washed by water or with other washing agents.

The amino resin crosslinked particles extracted in the separation step is heated in a temperature range of 130° C. to 230° C. (heating step). The heating step removes moisture on the amino resin particles and removes remaining unreacted formaldehyde, in addition to further promoting condensation (crosslinking) of the amino resin particles. A heating temperature below 130° C. in the heating step is not preferable because it is insufficient to properly condense (crosslink) the amino resin particles and causes the degree of hardness, heat resistance, and solvent resistance of the amino resin crosslinked particles to degrade. On the other hand, a heating temperature above 230° C. in the heating step is not preferable either because it may cause discoloring on the amino resin crosslinked particles. That is, by carrying out the heating step in the foregoing temperature range, it is possible to obtain amino resin crosslinked particles with high degree of hardness and superior solvent resistance and superior heat resistance, without discoloring.

In order to obtain amino resin crosslinked particles with less discoloring, it is preferable that the heating step be carried out under specific conditions, in addition to the neutralizing step. Specifically, the heating step should preferably be carried out under an inert gas atmosphere with an oxygen concentration of not more than 10 percent by volume. The oxygen concentration is preferably not more than 10 percent by volume, more preferably not more than 5 percent by volume, and even more preferably not more than 3 percent by volume. When the heating step is carried out under an inert gas atmosphere with an oxygen concentration of greater than 10 percent by volume, severe discoloring is caused on the amino resin crosslinked particles and intended properties of the amino resin crosslinked particles may not be obtained. It is therefore possible, by carrying out the heating step under an inert gas atmosphere with an oxygen concentration of not more than 10 percent by volume, to further suppress discoloring of the amino resin crosslinked particles. Note that, an inert gas atmosphere with an oxygen concentration of not more than 10 percent by volume is an atmosphere with an oxygen proportion of not more than 10 percent by volume and an inert gas proportion of not more than 90 percent by volume with respect to the entire atmosphere (gas). Examples of the inert gas include nitrogen gas, helium gas, and argon gas. Among these inert gases, nitrogen gas is preferable in terms of cost. Note that, in the following explanations, the term "heat treatment step" may be used to refer to a heating step in which heating is carried out under an inert gas atmosphere and in a temperature range of 130° C. 230° C.

In the case where the heating step is carried out for a number of times, for example, at different temperatures, at least one of these heating steps are preferably carried out under an oxygen concentration of not more than 10 percent by volume. It is more preferable that all heating steps be carried out under an oxygen concentration of not more than 10 percent by volume.

A method of heating is not particularly limited. For example, the heating step is finished when the moisture content of the amino resin crosslinked particles becomes not more than 3 percent by weight or less.

The average particle size of the amino resin crosslinked particles thus obtained is preferably in a range of 0.05 µm to 30 µm, or more preferably 0.1 µm to 15 µm. With the producing process of amino resin crosslinked particles according to the present invention, the standard deviation of the amino resin crosslinked particles can be controlled to be not more than 6 µm, preferably not more than 4 µm, and more preferably not more than 2 µm.

Further, by optionally carrying out steps of pulverizing, crushing, and/or classifying after the heating step, particles with an average particle diameter of not more than 10 µm, i.e., fine particles can be obtained. More specifically, particles with an average particle size of 0.01 µm to 10 µm, or more preferably 0.1 µm to 10 µm can be obtained. The amino resin crosslinked particles obtained by the producing process according to the present invention hardly aggregate. Therefore, only a small load is required to sufficiently pulverize the particles in the pulverizing step when it is carried out. Note that, the amino resin crosslinked particles will not be discolored in response to heat as easily as amino resin crosslinked particles of a conventional producing process because the remaining acid catalyst is neutralized. It is therefore a preferred embodiment to provide amino resin crosslinked particles having desirable discoloring resistance and a small average particle size.

The producing process of amino resin crosslinked particles according to the present invention, with the neutralizing step, can omit a conventional washing step for treating (e.g., removing) the acid catalyst. Thus, the producing steps of the amino resin crosslinked particles are simpler, in addition to being more economical because less drainage is produced over conventional washing steps. Further, the problem of discoloring on amino resin crosslinked particles in the heating step (heating treatment step), which was caused conventionally by a failure to remove the acid catalyst sufficiently by washing, can be solved by the provision of the neutralizing step in the producing process of amino resin crosslinked particles according to the present invention, by which the acid catalyst, which is the cause of discoloring, can be removed.

Color characteristics of the colorless amino resin crosslinked particles of the present invention can be more preferably evaluated by measuring a change of Hunter whiteness in a heat discoloring test that is carried out at 200° C. for 30 minutes, so as to assess whether the heat resistance of the colorless amino resin crosslinked particles is desirable. Thus, it is preferable in the colorless amino resin crosslinked particles of the present embodiment that a change of Hunter whiteness in a 200° C.×30 minutes heat discoloring test is within 15, more preferably within 10, and most preferably within 5. Amino resin crosslinked particles that are produced via a conventional step in which the acid catalyst is not removed (e.g., a step that does not neutralize the acid catalyst) discolor from white to yellow in a heat discoloring test, owning to the fact that the acid is remaining. That is, a Hunter whiteness drops in a 200° C.×30 minutes pyrolysis test and a change of Hunter whiteness exceeds 15. In other words, resistance to heat discoloration becomes poor. The acid catalyst can be desirably removed by first neutralizing the acid catalyst used in the curing step of the present invention, followed by a heating step. Note that, in evaluating color characteristics of the colorless amino resin crosslinked particles of the present invention, a change of Hunter whiteness in a 200° C.×30 minutes heat discoloring test can be preferably used for the evaluation, in addition to the foregoing evaluation of Hunter whiteness described in this embodiment. Further, the embodiment described thus far is essentially colorless or white amino resin crosslinked particles, including those particles that contain a fluorescent brightener, an anti-oxidant, and the like.

The amino resin crosslinked particles produced by the producing process according to the present invention has superior solvent resistance and superior heat resistance and high degree of hardness, without discoloring. This makes the amino resin crosslinked particles suitable for flatting agents; light diffusing agents; polishing agents; coating agents for various films;

fillers such as polyolefin (e.g., polyethylene or polypropylene), polyvinyl chloride, various types of rubbers, paints, and toners; rheology control agents, and coloring agents, for example.

Second Embodiment

Another embodiment of the present invention is described below. Amino resin crosslinked particles according to the present embodiment are the product of a condensation reaction between an amino compound and formaldehyde and are colored, wherein an area ratio in a solid-state $^{13}$C-NMR analysis of a carbon atom signal that originates from an —NH—CH$_2$—NH— bond (C(II) bond) to a carbon atom signal that originates from an —NH—CH$_2$O—CH$_2$—NH— bond (C(I) bond) is not less than 2, and a color difference in a heat discoloring test is not more than 15.

Note that, for convenience of explanation, elements or configurations already discussed in the First Embodiment will not be described again.

The amino resin crosslinked particles according to the Second Embodiment are colored with a dye and/or a pigment. Amino resin has superior affinity for a dye in particular. It is therefore preferable that the amino resin crosslinked particles are colored with a dye. Note that, in the Second Embodiment, a color difference in a heat discoloring test, instead of the Hunter whiteness of the First Embodiment, is defined as a property of the amino resin crosslinked particles.

The dye may be water-soluble or oil-soluble, examples of which include water-soluble monoazo dyes, water-soluble polyazo dyes, metal-containing azo dyes, dispersed azo dyes, anthraquinone acid dyes, anthraquinone vat dyes, indigo dyes, sulfide dyes, phthalocyanine dyes, diphenylmethane dyes, triphenylmethane dyes, nitro dyes, nitroso dyes, thiazol dyes, xanthene dyes, acridine dyes, azine dyes, oxazine dyes, thiazine dyes, benzoquinone dyes, naphthoquinone dyes, and cyanine dyes.

Examples of pigments include azo dyes such as fast yellow, disazo yellow, disazo orange, naphthol red, and pigment orange; organic pigments such as phthalocyanine blue, as phthalocyanine green, indanthrene blue, flavanthrone, dibromoanzanethrone, anthrapyrimidine, quinacridone, isoindolynone, thioindigo, perylene, and dioxadine; titanium oxide, iron oxide, zinc oxide, barium sulfate, calcium sulfate, barium carbonate, calcium carbonate, magnesium carbonate, talc, clay, and carbon black. These dyes and/or pigments may be used either individually or in a combination of two or more kinds, depending on the intended color of the amino resin crosslinked particles. Further, not limiting to dyes or pigments, any additive for the purpose of imparting color can be added to the colored amino resin crosslinked particles of this embodiment.

It is preferable that the colored amino resin crosslinked particles according to the present embodiment is colored with a fluorescent dye. The fluorescent dye re-radiates part of absorbed light energy in the form of fluorescent light having a longer wavelength than the incident wave. Therefore, the fluorescent dye has higher reflectance than ordinary dyes and imparts a highly photoluminescent color.

Examples of the fluorescent dye include Fluorescent Red 632 and Fluorescent Yellow 600 (products of Arimoto Chemical Co., Ltd.), Rhodamine B and Rhodamine 6GCP (the products of Sumitomo Chemical Co., Ltd.), Quinoline Yellow SS-5G and Quinoline Yellow GC (the products of Chuo Gousei Kagaku Co., Ltd.), Azosol Brilliant Yellow 4GF, Azosol Fast Blue GLA, Cellitone Pink 3B, Fast Yellow YL, Victoria Blue FN, Brilliant Sulfoflavin FF, thioflavin, Basic Yellow HG, fluorescein, and eosin.

These fluorescent dyes may be used individually or in a mixture of two or more kinds, depending on the intended color of the amino resin crosslinked particles.

Further, the fluorescent dye may be used in mixture with the dye and/or pigment.

In the Second Embodiment, the amino resin crosslinked particles of the present embodiment are rendered fluorescent by being colored with a fluorescent dye, and has a heat discoloring resisting property. Note that, in the following explanations, the "dye" includes a fluorescent dye.

It is preferable that the colored amino resin crosslinked particles according to the Second Embodiment have a color difference of not more than 15, or more preferably not more than 10, in a heat discoloring test. It is even more preferable, in addition to these preferable ranges of color difference, that a change in b value (Δb*) before and after the heat discoloring test is not more than 10. It is most preferable that a color difference and a change in b value (Δb*) before and after the heat discoloring test are both not more than 10.

In the heat discoloring test, the product colored amino resin crosslinked particles are allowed to stand for 30 minutes in a constant temperature device maintained at 200° C. A color difference is calculated from L value (index of brightness) and a value and b value (indices of chromaticness) before and after the heat discoloring test, which are measured using a spectrophotometer. More specifically, the colored amino resin crosslinked particles measured here are the product of the foregoing producing process with an additional ordinary purification step. In order to have a uniform temperature in the constant temperature device, a heat is applied to a predetermined amount of the colored amino resin crosslinked particles that are spread over a stainless steel bat.

A color difference is a $\Delta E^*_{ab}$ in the color system L*, a*, b*, which is calculated as follows.

$$\Delta E^*_{ab}=[(\Delta L^*)^2+(\Delta a^*)^2+(\Delta b^*)^2]^{1/2}$$

where ΔL*, Δa*, and Δb* are changes in their values before and after the heat discoloring test.

A color difference above 15 is not preferable because the colored amino resin crosslinked particles discolor. Note that, as the term is used in the present embodiment, a color difference that exceeds 15 in the heat discoloring test of the product amino resin crosslinked particles is regarded as "discoloring".

As described, it is preferable in the amino resin crosslinked particles according to the Second Embodiment, which are colored particles, that (a) a color difference of a heat discoloring test is not more than 15, and an area ratio in a solid-state $^{13}$C-NMR analysis of a carbon atom signal that originates from the C(II) bond to a carbon atom signal that originates from the C(I) bond is not less than 2, (b) a color difference of a heat discoloring test is not more than 15, and an amount of formaldehyde generated is not more than 1000 ppm in the pyrolysis test, and (c) a color difference of a heat discoloring test is not more than 15, and an area ratio in a solid-state $^{13}$C-NMR analysis of a carbon atom signal that originates from the C(II) bond to a carbon atom signal that originates from the C(IV) bond is not less than 0.20.

The following describes a producing process of colored amino resin crosslinked particles according to the Second Embodiment. The producing process of colored amino resin crosslinked particles according to the Second Embodiment includes the steps of: (1) adding a catalyst to an emulsion that was obtained by mixing an amino resin precursor, which is the product of a reaction between an amino compound and formaldehyde, with an aqueous solution of an emulsifier, so as to cure the amino resin precursor to prepare amino resin particles; (2) neutralizing a suspension that contains the amino resin particles obtained in step (1); and (3) heating the amino resin particles after step (2) in a temperature range of 130° C. to 230° C., wherein the step (1) of preparing the amino resin particles includes the step of coloring the amino resin precursor with a dye and/or a pigment.

Specifically, for example, a catalyst is added to an emulsion of an amino resin precursor, a dye, and an emulsifier, which is obtained by a reaction of the amino compound and formaldehyde, so as to cure the amino resin precursor and obtain amino resin particles (suspension containing amino resin particles). Thereafter, the remaining acid catalyst is neutralized by adding an alkali to adjust the pH of the suspension containing the amino resin particles, which is in a range of 1.5 to 3, within a range of not less than 5, or more preferably 5 to 9. After filtration, the amino resin particles are heated in a temperature range of 130° C. to 230° C. The heating temperature is preferably in a range of 130° C. to 210° C., or more preferably 130° C. to 190° C. The pH of the suspension is determined using a pH meter or the like.

A timing of adding a dye is described below. A timing of adding a dye is not particularly limited and a dye can be added at any stage in the step of preparing the amino resin particles, i.e., in the reaction step, emulsifying step, or curing step. In order to attain uniform color, a dye should be added in the reaction step. It is preferable that a dye be added, for example, in the form of a dispersion in water or an aqueous solution.

A dye added in the step of coloring the reaction solution (solution) according to the foregoing method of addition is an oil-soluble dye. The type of oil-soluble dye is not particularly limited. Specific examples include solvent-soluble dyes such as Oil Orange B and Oil Blue BA (the products of Chuo Gousei Kagaku Co., Ltd.), Azosol Brilliant Yellow 4GF, Azosol Fast Blue GLA, and Oil Red TR-71; and dispersive dyes such as Fast Yellow YL, Fast Blue FG, Cellitone Pink FF3B, and Cellitone Pink 3B. These dyes may be used individually or in a mixture of two or more kinds.

The amount of a dye contained in the dispersion is not particularly limited, and a range of 1 percent by weight to 50 percent by weight, or more preferably 20 percent by weight to 40 percent by weight is preferable. When the content of a dye is less than 1 percent by weight, a large volume of dispersion needs to be added, which might lower productivity of the amino resin crosslinked particles. On the other hand, when the content of a dye exceeds 50 percent by weight, the dispersion becomes less fluidic. In this case, handling of the dye may become difficult and it might take more effort to add the dye. When using an oil-soluble dye, a dispersion auxiliary agent may be optionally used when the dye is dispersed in water, because wettability of oil-soluble dyes in water is poor. Note that, a method of preparing a dispersion of a dye in water and a method of adding and mixing the dispersion with the reaction solution are not particularly limited.

The reaction solution (solution) with the dye dispersion is adjusted to have a pH of 6 to 12, or more preferably 7 to 9, using an alkaline agent, for example, such as sodium carbonate, sodium hydroxide, potassium hydroxide, or ammonium water. This enables the condensation and curing of the amino resin precursor in the curing step to be sufficiently controlled. The amount of alkaline agent added is not particularly limited. Further, the alkaline agent can be added and mixed in any form but the form of an aqueous solution is preferable.

The emulsion of the amino resin precursor can be obtained by adding and mixing the dye dispersion in the reaction solution containing the amino resin precursor, and then by emulsifying the reaction solution, after adjusting pH, in the presence of an emulsifier. The type of emulsifier is not particularly limited, and the emulsifier as described in the First Embodiment is used.

An additional step (second coloring step) may be provided to add a dye to the emulsion produced in the emulsifying step. The dye should dissolve in water, i.e., water-soluble dyes are used. The type of water-soluble dye is not particularly limited. Examples of water-soluble dyes include basic dyes such as Rhodamine B and Rhodamine 6GCP (the products of Sumitomo Chemical Co., Ltd.), Methyl Violet FN, and Victoria Blue FN; and acidic dyes such as Quinoline Yellow SS-5G and Quinoline Yellow GC (the products of Chuo Gousei Kagaku Co., Ltd.), Acid Magenta O, Methyl Violet FB, and Victoria Blue FB. These dyes may be used individually or in a mixture of two or more kinds. By the coloring step (first coloring step) of adding a dispersion of an oil-soluble solvent in water and by the second coloring step, it is possible to obtain amino resin crosslinked particles with more uniform color, i.e., particles with improved color uniformity.

The concentration of the dye in an aqueous solution, when the dye is added in the form of an aqueous solution in the second coloring step, is not particularly limited, but a range of 0.1 percent by weight to 5 percent by weight is preferable, and a range of 1 percent by weight to 3 percent by weight is more preferable. When the concentration of the dye is less than 0.1 percent by weight, a large volume of aqueous solution needs to be added, which might lower productivity of the amino resin crosslinked particles. On the other hand, when the concentration of the dye exceeds 5 percent by weight, the emulsion containing the dye becomes instable, which might cause the amino resin crosslinked particles to enlarge or particles to aggregate. Note that, a method of preparing an aqueous solution of a dye in water and a method of adding and mixing the aqueous solution with the emulsion are not particularly limited.

Note that, the foregoing explanations, which were based on a dye, are also applicable to a pigment and a fluorescent pigment. Accordingly, no further explanations will be given thereto.

The amino resin crosslinked particles according to the Second Embodiment may also be colored with a white dye and/or a white pigment. In this case, the amino resin crosslinked particles satisfy at least one of (a) Hunter whiteness of not less than 85 percent and (b) color difference of not more than 15 in a heat discoloring test, in addition to the foregoing heat discoloring resisting property (area ratio of signals in a solid-state $^{13}$C-NMR analysis in the foregoing ranges).

The colored amino resin crosslinked particles thus obtained has an average particle size preferably in a range of 0.05 μm to 30 μm, or more preferably 0.1 μm to 15 μm. With the producing process of amino resin crosslinked particles according to the present invention, the standard deviation of the amino resin crosslinked particles can be controlled to be not more than 6 μm, more preferably not more than 4 μm, and most preferably not more than 2 μm.

As described, the amino resin crosslinked particles of the present invention, which is produced by condensation of an amino compound and formaldehyde, are adapted so that an area ratio in a solid-state $^{13}$C-NMR analysis of a carbon atom signal that originates from the —NH—CH$_2$—NH— bond to a carbon atom signal that originates from the —NH—CH$_2$O—CH$_2$—NH— bond is not less than 2, and a color difference of a heat discoloring test is not more than 15.

As described, the colored amino resin crosslinked particles of the present invention, which is produced by condensation of an amino compound and formaldehyde, are adapted so that the amount of formaldehyde generated is 1000 ppm in a pyrolysis test, and a color difference of a heat discoloring test is not more than 15.

As described, the colored amino resin crosslinked particles of the present invention, which is produced by condensation of an amino compound having a triazine ring and formaldehyde, are adopted so that an area ratio in a solid-state $^{13}$C-NMR analysis of a carbon atom signal that originates from the —NH—CH$_2$—NH— bond to a carbon atom signal that originates from a triazine ring of the amino compound is not less than 0.20, and a color difference of a heat discoloring test is not more than 15.

The colored amino resin crosslinked particles of the present invention, with a color difference of not more than 15 in a heat discoloring test and with a 2.0 or greater area ratio in a solid-state $^{13}$C-NMR analysis of a carbon atom signal that originates from the —NH—CH$_2$—NH— bond to a carbon atom signal that originates from the —NH—CH$_2$O—CH$_2$—NH— bond, contain a small proportion of the —NH—CH$_2$O—CH$_2$—NH— bond. Thus, the product colored amino resin crosslinked particles, in addition to the desirable heat resistance, generate less formaldehyde when heated. Further, because the colored amino resin crosslinked particles contain more —NH—CH$_2$—NH— bonds, the product amino resin crosslinked particles have high degree of hardness and superior heat resistance and superior solvent resistance.

It is preferable in the colored amino resin crosslinked particles of the Second Embodiment that the amino compound contains at least one kind of compound selected from the group consisting of benzoguanamine, cyclohexane carboguanamine, cyclohexene carboguanamine, and melamine, in an amount of 40 percent by weight to 100 percent by weight, and that the mole ratio of the amino compound to the formaldehyde is in a range of 1:1.5 to 1:3.5.

As described, the producing process of colored amino resin crosslinked particles of the Second Embodiment includes the steps of: (1) adding a catalyst to an emulsion that was obtained by mixing an amino resin precursor, which is the product of a reaction between an amino compound and formaldehyde, with an aqueous solution of an emulsifier, so as to cure the amino resin precursor to prepare amino resin particles; (2) neutralizing a suspension that contains the amino resin particles obtained in step (1); and (3) heating the amino resin particles after step (2) in a temperature range of 130° C. to 230° C., wherein the step (1) of preparing the amino resin particles includes the step of coloring the amino resin precursor with a dye and/or a pigment.

By thus neutralizing the suspension after the curing step, discoloring of the colored amino resin crosslinked particles, which might occur in the heating step after the neutralizing step, can be suppressed. In addition, by heating the amino resin crosslinked particles at 130° C. or a greater temperature, water and remaining formaldehyde can be removed, in addition to promoting condensation. As a result, it is possible to provide colored amino resin crosslinked particles having high degree of hardness and superior solvent resistance and superior heat resistance, which generate almost no odor of formaldehyde when heated.

In the producing process of the present invention, the heating step that is carried out in an atmosphere of inert gas can be suitably adapted when the amino resin crosslinked particles, after separated from the reaction solution, are heated at a relatively high temperature (at least 130° C.). Specifically, the producing process of the present invention, in the producing process of amino resin crosslinked particles with the curing step using an acid catalyst and a heating step for heating amino resin particles at a relatively high temperature after they were separated from the cured suspension, further includes a step of neutralizing the acid catalyst; and/or a heating step that is carried out in an atmosphere of inert gas.

Another embodiment of such an invention, with a slight modification to the First and Second Embodiments, is described below.

Third Embodiment

In a producing process of amino resin crosslinked particles according to the present embodiment, an initial condensate (amino resin precursor), having affinity to water, composed of melamine, benzoguanamine, and formaldehyde, or composed of melamine or benzoguanamine and formaldehyde, is condensed and cured in an aqueous solution containing a surfactant, in the presence of alkylbenzene sulfonic acid with an alkyl group of 10 to 18 carbon atoms, so as to prepare a suspension of cured resin. The cured resin is then separated from the suspension and dried in an atmosphere of inert gas to obtain amino resin crosslinked particles. The amino resin crosslinked particles obtained according to this process have a uniform particle size.

Note that, for convenience of explanation, elements or configurations already discussed in the First and Second Embodiments will not be described again.

Specifically, the producing process of amino resin crosslinked particles according to the present embodiment includes the steps of adding a catalyst to a mixture of an amino resin precursor, which is the product of a reaction of an amino compound and formaldehyde with an aqueous solution of a surfactant, so as to cure the amino resin precursor and prepare amino resin particles; and heating the amino resin particles in an atmosphere of inert gas whose oxygen concentration is not more than 10 percent by volume, and in a temperature range of 130° C. to 230° C.

The initial condensate, having affinity to water, composed of melamine, benzoguanamine, and formaldehyde, or composed of melamine or benzoguanamine, and formaldehyde, used in the present embodiment is a water-soluble resin or a water-dispersive resin, which is obtained by a reaction of melamine and/or benzoguanamine with formaldehyde, or a reaction of a mixture of the two with formaldehyde, according to an ordinary method. The degree of water affinity is generally decided by the amount of water dropped, in percent by weight with respect to the initial condensate, on the initial condensate maintained at 15° C. to turn the initial condensate turbid. (This measure of water affinity will be referred to as miscibility with water.) A miscibility with water suitable in the present embodiment is 100 percent or greater. An initial condensate with a miscibility with water less than 100 percent produces a relatively non-uniform emulsion having large particle sizes, even when dispersed in an aqueous solution containing a surfactant, which makes it difficult to obtain amino resin crosslinked particles with uniform particle size.

The formaldehyde may be, for example, in the form of formalin, trioxane, or paraformaldehyde, having a capability to generate formaldehyde.

Specific examples of surfactant include anionic surfactants, cationic surfactants, non-ionic surfactants, and amphoteric surfactants. Of these surfactants, anionic surfactants, non-ionic surfactants, or a mixture of these two surfactants are preferable.

Examples of anionic surfactants include alkali metal alkylsulfates such as sodium dodecyl sulfate and potassium dodecyl sulfate; ammonium alkylsulfates such as ammonium alkyl sulfate; sodium dodecyl polyglycol ether sulfate; sodium sulforicinoate; alkali metal salts such as sulfonated paraffin; alkylsulfonates, such as ammonium salts of sulfonated paraffin; sodium laurate; triethanol amine oleate; fatty acid salts such as triethanolamine abietate; alkylarylsulfonates, such as alkali metal sulfonates of sodium dodecylbenzene sulfonate or alkali phenol hydroxyethylene; high alklylnaphthalenesulfonate; a condensate of naphthalene sulfonic acid and formalin; dialkylsulfosuccinate; polyoxyethylene alkylsulfate salt.

Examples of non-ionic surfactants include polyoxyethylene alkylether; polyoxyethylene alkylarylether; sorbitan fatty acid ester; polyoxyethylene sorbitan fatty acid ester; fatty acid monoglyceride such as monolaurate of glycerol; copolymer of polyoxyethylene and oxypropylene; and a condensate of ethyleneoxide and fatty amine, an amide, or an acid.

The amount of surfactant added is preferably in a range of 0.01 percent by weight to 10 percent by weight with respect to 100 percent by weight of the initial condensate. With an amount of surfactant less than 0.01 percent by weight, a stable suspension of cured resin may not be obtained. On the other hand, with an amount of surfactant more than 10 percent by weight, undesirable bubbles may form in the emulsion or suspension. In other cases, the properties of the product amino resin crosslinked particles may be adversely affected.

In the present embodiment, the alkylbenzenesulfonic acid having an alkyl group with 10 to 18 carbon atoms shows an unique surfactant action in the aqueous solution of the initial condensate, and therefore is an indispensable component to produce a stable suspension of the cured resin. Examples of the alkylbenzenesulfonic acid include decylbenzenesulfonic acid, dodecylbenzenesulfonic acid, tetradecylbenzenesulforiic acid, hexadecylbenzenesulfonic acid, and octadecylbenzenesulfonic acid. These alkylbenzenesulfonic acids may be used individually or in combination of two or more kinds.

The amount of alkylbenzenesulfonic acid used is preferably 0.1 percent by weight to 20 percent by weight, or more preferably 0.5 percent by weight to 10 percent by weight, with respect to 100 percent by weight of the initial condensate. When the amount of alkylbenzenesulfonic acid is less than 0.1 percent by weight, the reaction time of condensation and curing is prolonged and a stable suspension of the cured resin may not be obtained. As a result, the amino resin crosslinked particles may aggregate to produce coarse particles. On the other hand, when the amount of alkylbenzenesulfonic acid is more than 20 percent by weight, the alkylbenzene sulfonic acid will be distributed in excess in the cured resin in the suspension, with the result that the cured resin is plasticized. This encourages the particles to aggregate or fuse during condensation and curing. As a result, the amino resin crosslinked particles may not be obtained in uniform particle size.

In the present embodiment, the initial condensate having affinity to water can be condensed and cured in an aqueous solution by adding the surfactant and alkylbenzenesulfonic acid to the aqueous solution of the initial condensate or to a white emulsion, which is a dispersion of the initial condensate in water, and by maintaining the mixture with stirring at a temperature of 0° C. to a temperature greater than 100° C. under applied pressure.

The surfactant and alkylbenzenesulfonic acid can be added, for example, (1) by adding the initial condensate to an aqueous solution containing the surfactant and alkylbenzenesulfonic acid, or (2) by adding the surfactant and alkylbenzenesulfonic acid to an aqueous solution containing the initial condensate.

The concentration of the initial condensate in the aqueous solution is preferably in a range of 5 percent by weight to 20 percent by weight, taking into account ease of handling of the emulsion and cost of operation.

The reaction of condensation and curing is generally finished upon raising the temperature to a 90° C. or greater temperature and maintaining this temperature for a certain period of time. However, high-temperature curing is not necessarily required and condensation may only be carried out at a low temperature and for a short period of time, provided that the cured resin in the suspension is cured to the degree where it does not swell by methanol or acetone.

The suspension of the cured resin so obtained contains a uniform particle size and is highly stable without aggregation of particles. The cured resin can be separated from the suspension of cured resin by a conventional method. Specifically, the cured resin can be separated from the suspension by various separation methods, such as separation by natural precipitation, centrifugation, or decantation, or alternatively separation by filtration.

In the producing process of amino resin crosslinked particles according to the present embodiment, the cured resin separated from the suspension is heated in an atmosphere of inert gas. That is, there is provided a heating step in an atmosphere of inert gas, i.e., a heat treatment step is provided.

In the present embodiment, the heating step (heat treatment step) in an atmosphere of inert gas is a step in which the particles (cured resin) separated from the reaction solution (suspension) are heated in an atmosphere of inert gas when they are dried. By the heat treatment step, i.e., by heating the cured resin in an atmosphere of inert gas, the cured resin, in addition to being dried, can be further crosslinked by the remaining curing catalyst. A detailed explanation in regard to heating in an atmosphere of inert gas will not be given here because it was explained in the Second Embodiment. Specifically, the cured resin may be dried in an atmosphere of inert gas by drying under reduced pressure or hot-air drying.

By drying the cured resin in an atmosphere of inert gas, discoloring of the amino resin crosslinked particles can be suppressed. More specifically, in the case of colorless amino resin crosslinked particles, the Hunter whiteness of the product amino resin crosslinked particles is 85 percent or greater. In the case of colored amino resin crosslinked particles, the color difference of the amino resin crosslinked particles before and after the heat discoloring test is not more than 15.

Further, the separation can be facilitated by adding a coagulant, such as aluminum sulfate, prior to the separation.

The dried cured resin can be crushed using, for example, a ball mill to obtain spherical and uniform amino resin crosslinked particles (narrow particle distribution).

Note that, in the foregoing description, the "emulsion" refers to an emulsion and/or a suspension.

The cured resin (amino resin particles) can be obtained in the described manner, for example, (X) by mixing, when using a water-soluble raw material such as melamine, dodecylbenzenesulfonic acid with the resulting amino resin precursor (initial condensate), so as to condense, cure, and thereby deposit amino resin particles, or (Y) by condensing and curing, when using a water-insoluble raw material such as benzoguanamine, the resulting amino resin precursor (initial condensate) in a water-dispersed state and in the presence of a catalyst, so as to obtain amino resin particles.

In summary, the producing process with the step of neutralizing the acid catalyst is applicable to producing processes of amino resin crosslinked particles when the processes use at least the acid catalyst and obtain a suspension of amino resin particles.

Further, the producing process with the step of further heating the amino resin particles in an atmosphere of inert gas after separating the amino resin particles from the suspension and heating them at a relatively high temperature (130° C. or greater) is applicable to any producing process if the process includes at least the step of separating the amino resin particles from the suspension after curing and subsequently heating the amino resin particles. That is, the producing process of the present invention includes the step of neutralizing the acid catalyst, and/or the step of heating the amino resin particles in an atmosphere of inert gas, in addition to the curing step using an acid catalyst, and the heating step, in which the amino resin particles separated from the suspension after curing is heated at a relatively high temperature (130° C. or greater). The substance of the foregoing process is therefore applicable to all of the foregoing First, Second, and Third Embodiments. The producing process of amino resin crosslinked particles is also applicable to other embodiments within the modification range of the present invention. Such embodiments, obviously, are also within the scope of the present invention.

EXAMPLES

The present invention will be described in more detail by way of Examples and Comparative Examples. The product amino resin crosslinked particles were analyzed under the following measurement conditions, using a solid-state $^{13}$C-NMR device (BRUKER AVANCE 400, the product of Bruker).

The measurement was carried out under the following conditions:
Probe used: 4 mm MAS400;
Target nucleus: $^{13}$C;
Resonance frequency of target nucleus: 100.63 MHz;
90° pulse of target nucleus: 4.0 μs;
Pulse Program: DD/MAS (dipole decoupling method);
Pulse width of target nucleus: 1.5 μs;
Recurrent time: 40 seconds;
Number of integration: 4096;
Temperature of observation: 300 K;
Chemical shift value of reference material: Glycine (176.03 ppm, 44.02 ppm)

Various properties of the product amino resin crosslinked particles were measured in the manner described below.

A Hunter whiteness was measured in accordance with the JIS standard P8123, using a spectrocalorimeter (SZ-Σ80, Nippon Denshoku Kogyo Co., Ltd.).

A color difference of colored amino resin crosslinked particles was measured as follows.

3 ml of ethylene glycol was placed in a plastic bag containing 2.00 g of a sample. After uniformly dispersing the sample therein, the sample was transferred onto glass cells (calorimeter Σ80 cell; 30 mm diameter). The glass cells with the evenly dispersed sample was then placed in a calorimeter (Macbeth color eye 3000, the product of SAKATA INX), so as to measure color difference. As a standard white board, a ceramic calibration tile for Macbeth color eye 3000 was used. Note that, a first-rate reagent was used for the ethylene glycol.

Solvent resistance was measured as follows. 10 ml of acetone and 0.5 g of amino resin crosslinked particles of an Example or a Comparative Example were added into a glass container to prepare a dispersion. After stirring the dispersion for 1 minute at 300 rpm and 25° C., the dispersion was filtered out through a filter paper (Toyo Filter Paper, Co., Ltd., No. 2). The surface morphology of the amino resin crosslinked particles remaining on the filter paper was observed under a microscope (at 400 times magnification). Evaluations were made such that aggregated coarse amino resin crosslinked particles were denoted as "x", and non-aggregated and non-coarse amino resin crosslinked particles were denoted as "◦". The surface of amino resin crosslinked particles with low (poor) solvent resistance is eroded by the solvent and becomes sticky, with the result that the amino resin crosslinked particles aggregate to produce coarse particles.

Light resistance was measured as follows. A 150 ml glass container was charged with amino resin crosslinked particles of an Example or a Comparative Example, 60 g of 3 φ glass beads, 8 g of vinyl chloride sol, and 30 g of toluene, so as to prepare a reagent. The mixture was then shaken for 30 minutes using a paint shaker (PAINT SHAKER, the TOYOSEIKI product). The vinyl chloride sol is a mixture of 49.5 percent by weight of vinyl chloride paste resin (provided by (Kaneka Corporation), 49.5 percent by weight of dioctylphthalate, and 1 percent by weight of a vinyl chloride stabilizer (TMF-380G, the product of Tokyo Fine Chemical Co., Ltd.). After shaking, an suitable amount of sample was placed on a Boron-Kent paper and evenly spread over the Boron-Kent paper with a bar coater No. 12. Then, a portion of the Boron-Kent paper coated with the sample was covered with an aluminum foil and UV light was projected thereon for 5 hours at an UV intensity of 100 mW/cm$^2$, using a UV light irradiating device (EYE SUPER UV TESTER, model SUV-F1, provided by Iwasaki Electric Co., Ltd.). Then, changes in color of the Boron-Kent paper irradiated with the UV light and not irradiated with the UV light (covered with the aluminum foil) were observed by visual inspection. Evaluations were made such that discoloring was denoted as "x" and no discoloring was denoted as "◦".

The amount of formaldehyde ("HCHO" hereinafter) generated was measured by gas chromatography by measuring the amount of formaldehyde generated when 1 mg of the product amino resin crosslinked particles were heated at 160° C. The odor given off by the amino resin crosslinked particles heated at 160° C. was also confirmed. The measurement conditions of gas chromatography (pyrolytic device JHP-2, the product of Japan Analytical Industry Co., Ltd.; gas analyzer GC-14A (detector: TCD), the product of Shimadzu Corporation) were such that the initial temperature of pyrolysis was 160° C. and the duration of pyrolysis was 5 seconds, using a measurement column (APS-201 Flusin T, 20%, 60/80 mesh, 3.2φ×3.1 m).

The heat discoloring test was carried out in the following manner. 100 g of dried amino resin crosslinked particles (colorless or colored), which were spread in thin layer over a 50 cm×50 cm stainless bat, were placed in a constant temperature device of 200° C. for 30 minutes. Air was circulated in the constant temperature device. A change of Hunter whiteness and a color difference were measured in the heat discoloring test to evaluate resistance to heat discoloration.

An average particle size was measured using the Coulter Multisizer Type II, the product of Coulter Inc. Note that, any particle size measuring device of equivalent performance and equivalent standard may be used to measure an average particle size.

The following Examples 1 through 6 are based on a process that comprises the steps of (1) adding a catalyst to an emulsion of an amino resin precursor, the emulsion being a mixture of an amino resin precursor, which is the product of a reaction of an amino compound with formaldehyde, and an aqueous solution of the emulsion, so as to cure the amino resin precursor in an emulsion state and obtain a suspension of the amino resin precursor; (2) neutralizing the suspension of step (1) containing amino resin particles; and (3) heating the amino resin particles in a temperature range of 130° C. to 230° C. That is, the following Examples 1 through 6 do not limit the present invention in any ways.

Further, the Examples 1 through 3 and Comparative Examples 1 and 2 correspond to the First Embodiment.

The Examples 4 through 6 and Comparative Examples 3 and 4 correspond to the Second Embodiment.

The Examples 7 through 9 and Comparative Example 5 correspond to the Third Embodiment.

Note that, it is assumed in the following Examples and Comparative Examples that the heating step (heat treatment step) is carried out in air unless otherwise noted.

Example 1

A 10 L reactor equipped with a stirrer, a reflux condenser, a thermometer, and a vibration viscometer (product of MIVI ITS JAPAN; Model No. MIVI 6001) was charged with 3000 g (16 moles) of benzoguanamine as an amino compound, 2600 g of 37 percent by weight formalin (32 moles of formaldehyde), and 10 g of an aqueous solution of 10 percent by weight sodium carbonate (0.01 mole of sodium carbonate). The temperature of the reaction mixture was raised with stirring to 95° C. to start a reaction.

The reaction was ended by cooling the reaction solution when the viscosity of the reaction mixture became $4.5 \times 10^{-2}$ Pa·s (45 cP) (5 hours into the reaction). The result was a reaction solution containing an amino resin precursor, which is the initial condensate of benzoguanamine and formaldehyde (reaction step).

Then, an aqueous solution dissolving 120 g of polyvinyl alcohol (product name PVA 205, provided by Kuraray Co., Ltd.) as an emulsion in 2050 g of water was charged in a 15 L reactor equipped with a reflux condenser, a homomixer (stirrer, provided by Tokushu Kika Kogyo Co., Ltd.), and a thermometer, etc. The temperature of the mixture was raised to 75° C. with stirring. After adding the reaction solution to the reactor, the temperature of the reaction mixture was raised to 77° C. and the content was vigorously stirred at 7000 rpm at a maintained temperature of 77° C., so as to emulsify the amino resin precursor and obtain an emulsion that contained the amino resin precursor in a concentration of 52.5 percent by weight (emulsifying step). A measurement of the emulsion with the multisizer showed that the amino resin precursor in the emulsion had an average particle size (d50) of 2.4 μm and a standard deviation of 0.7 μm. The emulsion so obtained was cooled to 30° C. To the reactor was then added, as a water dispersion of silica provided as an inorganic compound, 3000 g of AEROSIL 200 (provided by Japan Aerosil) with a solid concentration of 10 percent by weight. Thereafter, the content was stirred with the homomixer for 5 minutes at 4000 rpm.

Then, an aqueous solution dissolving 40 g (0.4 mole) of concentrated sulfuric acid as a catalyst in 1200 g of pure water was added to the emulsion (at a content temperature 30° C.), and the temperature of the reaction mixture was raised with stirring to 90° C. at 10° C./hr. The reaction mixture was maintained at 90° C. for an hour to condense and cure the amino resin precursor (curing step). Thus, the total reaction time was 7 hours.

After the curing step, the suspension containing amino resin particles was cooled to 30° C., and the pH of the suspension was adjusted to 7.5, using 5 percent by weight sodium hydroxide aqueous solution (neutralizing step). After the neutralizing step, the amino resin particles were separated from the suspension by filtration. The amino resin particles thus separated was heated for 3 hours at 150° C. (heating step) and gently crushed with a pestle in a mortar. The result was a white powder of amino resin crosslinked particles. Measurements of the amino resin crosslinked particles with the multisizer showed that the amino resin crosslinked particles had an average particle size (d50) of 2.7 μm and a standard deviation of 0.8 μm. Then, a solid-state $^{13}$C-NMR analysis of the amino resin crosslinked particles was carried out, and Hunter whiteness, solvent resistance, light resistance, and an amount of HCHO generated in a pyrolysis test were measured. In addition, odor was confirmed. The main reaction conditions and results are summarized in Table 1. The results of solid-state $^{13}$C-NMR analysis on the amino resin crosslinked particles are shown in FIG. 1. In the solid-state $^{13}$C-NMR analysis, the resulting spectrum had a C(I) derived carbon atom signal in a 60 ppm to 90 ppm range, a C(II) derived carbon atom signal in a 30 ppm to 70 ppm range, a C(III) derived carbon atom signal in a 110 ppm to 150 ppm range, and a C(IV) derived carbon atom signal in a 155 ppm to 190 ppm range.

Example 2

A reaction step was carried out in the same manner as in Example 1. The reaction was ended when the viscosity became $5.5 \times 10^{-2}$ Pa·s (55 cP) (5.5 hours into the reaction), so as to obtain an amino resin precursor. Then, an emulsifying step was carried out as in Example 1 to obtain an emulsion that contained the amino resin precursor in a concentration of 52.5 percent by weight. The amino resin precursor in the emulsion had an average particle size 2.6 μm and a standard deviation 1.01 μm. The emulsion so obtained was cooled to 30° C. To the reactor was then added, as a water dispersion of alumina provided as an inorganic compound, 3000 g of Aluminum Oxide C (product of Japan Aerosil) with a solid concentration of 10 percent by weight. The content of the reactor was stirred for 5 minutes at 4000 rpm, using a homomixer. The emulsion was used to carry out the subsequent steps, including a curing step and a neutralizing step, as in Example 1, so as to obtain amino resin crosslinked particles in the form of a white powder. The amino resin crosslinked particles had an average particle size 2.8 µm and a standard deviation 1.1 µm. The same measurement and confirmation were carried out as in Example 1. The main reaction conditions and results are summarized in Table 1.

Example 3

A heating step was carried out in an atmosphere of nitrogen (oxygen concentration of 3 percent by volume). That is, amino resin crosslinked particles of a white powdery form was obtained as in Example 1 with the additional heating step. The product amino resin crosslinked particles had a Hunter whiteness of 93 percent.

Comparative Example 1

Figure 2:
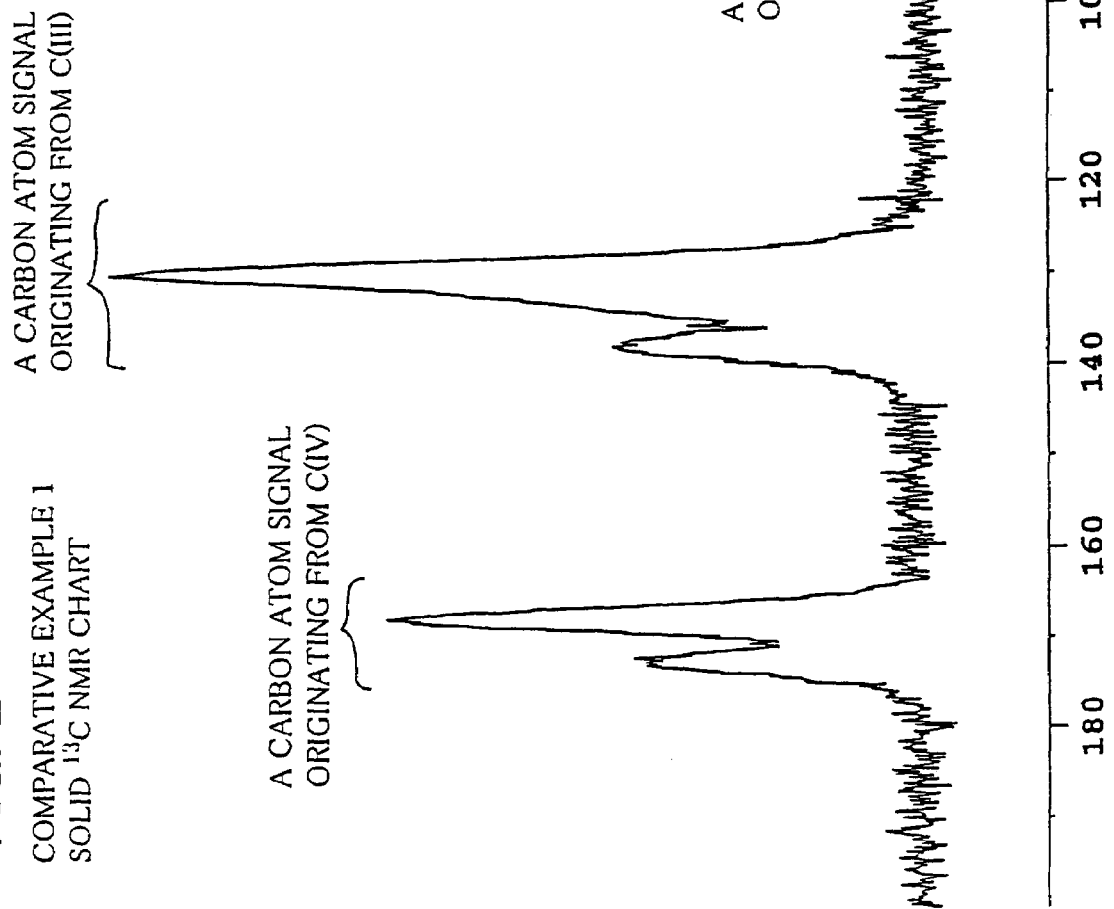
FIG. 2 is a solid-state $^{13}$C-NMR analysis spectrum of amino resin crosslinked particles of Comparative Example 1.

A reaction step and an emulsifying step were carried out as in Example 1. The reaction was allowed until the viscosity of the reaction solution became $6.0 \times 10^{-2}$ Pa·s (60 cP), so as to obtain an emulsion that contained an amino resin precursor in a concentration of 52.5 percent by weight. The amino resin precursor in the emulsion had an average particle size 5.6 µm and a standard deviation 1.25 µm. The emulsion was cooled to 30° C. and a water dispersion of silica was added thereto as in Example 1. Then, a curing step was carried out as in Example 1, except that 160 g of DBS (dodecylbenzenesulfonic acid) was used. Thereafter, amino resin particles were separated from the suspension by filtration, without carrying out the neutralizing step. The amino resin particles thus separated were then heated for 5 hours at 100° C. and gently crushed with a pestle in a mortar. The result was amino resin crosslinked particles of a white powdery form. That is, in this Comparative Example 1, the neutralizing step and the heat treatment step of a relatively high temperature (130° C. to 230° C.) were not carried out. The amino resin crosslinked particles had an average particle size 5.6 µm and a standard deviation 1.27 µm. The same measurement and confirmation were carried out as in Example 1. The main reaction conditions and results are summarized in Table 1. In addition, the result of solid-state $^{13}$C-NMR analysis on the product amino resin crosslinked particles is shown in FIG. 2.

Comparative Example 2

A reaction step and an emulsifying step were carried out as in Example 1, so as to obtain an emulsion that contained an amino resin precursor in a concentration of 52.5 percent by weight. The amino resin precursor in the emulsion had an average particle size 2.4 µm and a standard deviation 0.7 µm. The emulsion was cooled to 30° C. and a water dispersion of silica was added thereto as in Example 1. Then, a curing step was carried out as in Example 1. Thereafter, amino resin particles were separated from the suspension by filtration, without carrying out the neutralizing step. The amino resin particles thus separated were then subjected to subsequent steps, including the heating step, as in Example 1. The result was amino resin crosslinked particles of a slightly yellowish white powdery form. That is, in this Comparative Example 2, without the neutralizing step, the whiteness slightly dropped to 80 percent by the heating step. The amino resin crosslinked particles had an average particle size 2.7 µm and a standard deviation 0.8 µm. The same measurement and confirmation were carried out as in Example 1. The main reaction conditions and results are summarized in Table 1.

TABLE 1

| | EXAMPLE 1 | EXAMPLE 2 | EXAMPLE 3 | COMPARATIVE EXAMPLE 1 | COMPARATIVE EXAMPLE 2 |
|---|---|---|---|---|---|
| MONOMER | BG | BG | BG | BG | BG |
| RESIN TEMPERATURE (° C.) | 95 | 96 | 95 | 95 | 95 |
| VISCOSITY OF REACTION SOLUTION AFTER REACTION ($\times 10^{-2}$ Pa·s) | 4.5 | 5.5 | 4.5 | 6.0 | 4.5 |
| PVA (g/BG 100 g) | 4 | 4 | 4 | 4 | 4 |
| TEMPERATURE OF EMULSIFICATION (° C.) | 77 | 77 | 77 | 77 | 77 |
| CONCENTRATION OF EMULSIFICATION (WT %) | 52.5 | 52.5 | 52.5 | 52.5 | 52.5 |
| AVERAGE PARTICLE SIZE AFTER EMULSIFICATION d50 (µm) | 2.4 | 2.6 | 2.4 | 5.6 | 2.4 |
| STANDARD DEVIATION OF PARTICLES AFTER EMULSIFICATION (µm) | 0.7 | 1.01 | 0.7 | 1.25 | 0.7 |
| CURING CATALYST | SULFURIC ACID | SULFURIC ACID | SULFURIC ACID | DBS | SULFURIC ACID |
| AMOUNT OF CATALYST ADDED (WT %) | 1.3 | 1.3 | 1.3 | 5.3 | 1.3 |
| pH OF SUSPENSION AFTER NEUTRALIZATION | 7.5 | 6.0 | 7.5 | 3.0 | 3.1 |
| HEATING TEMPERATURE (° C.) | 150 | 150 | 150 | 100 | 150 |
| AVERAGE PARTICLE SIZE AFTER PULVERIZATION d50 (µm) | 2.7 | 2.8 | 2.7 | 5.6 | 2.7 |
| STANDARD DEVIATION OF PARTICLES AFTER PULVERIZATION (µm) | 0.8 | 1.1 | 0.8 | 1.27 | 0.8 |
| NMR AREA RATIO | | | | | |
| C(II)/C(I) | 3.86 | 3.60 | 3.86 | 0.67 | 3.83 |
| C(II)/C(III) | 0.13 | 0.12 | 0.13 | 0.06 | 0.12 |
| C(II)/C(IV) | 0.25 | 0.24 | 0.25 | 0.13 | 0.25 |
| HUNTER WHITENESS (%) | 92 | 91 | 93 | 84 | 80 |
| HUNTER WHITENESS AFTER HEAT RESISTANCE TEST (%) | 88 | 87 | 90 | 65 | 64 |
| SOLVENT RESISTANCE | ○ | ○ | ○ | x | ○ |

TABLE 1-continued

|  | EXAMPLE 1 | EXAMPLE 2 | EXAMPLE 3 | COMPARATIVE EXAMPLE 1 | COMPARATIVE EXAMPLE 2 |
|---|---|---|---|---|---|
| LIGHT RESISTANCE | ○ | ○ | ○ | X | ○ |
| AMOUNT OF HCHO GENERATED (ppm) | NOT DETECTED | NOT DETECTED | NOT DETECTED | 15000 | NOT DETECTED |
| ODOR | VERY WEAK | VERY WEAK | VERY WEAK | STRONG | VERY WEAK |

Note that, in Table 1, "BG" and "PVA" indicate benzoguanamine and polyvinyl alcohol, respectively. The unit of PVA is gram per 100 g of benzoguanamine.

As is clear from the results in Table 1, by the neutralizing step for neutralizing the suspension that contains amino resin particles and by the subsequent heating step for heating the amino resin crosslinked particles in a temperature range of 130° C. to 230° C., it is possible to obtain amino resin crosslinked particles that have a Hunter whiteness of not more than 85 percent and that generate formaldehyde in an amount of not more than 1000 ppm in a pyrolysis test. The amino resin crosslinked particles that were produced without the neutralizing step have a Hunter whiteness below 85 percent, i.e., the amino resin crosslinked particles discolored. Table 1 also shows that the amino resin crosslinked particles that were heated at a temperature below 130° C. generate formaldehyde in a pyrolysis test and have poor solvent resistance.

Note that, the amino resin crosslinked particles of Examples 1 and 2 were additionally heated at 150° C. to observe any change of color over time. After several hours, essentially no change of color was observed on the amino resin crosslinked particles.

(Colored Amino Resin Crosslinked Particles)

The following Examples 4 through 6, and Comparative Examples 3 and 4 correspond to the Second Embodiment of the present invention.

Example 4

A 10 L reactor equipped with a stirrer, a reflux condenser, a thermometer, and a vibration viscometer (product of MIVI ITS JAPAN; Model No. MIVI 6001) was charged with 3000 g (16 moles) of benzoguanamine as an amino compound, 2600 g of 37 percent by weight formalin (32 moles of formaldehyde), and 10 g of an aqueous solution of 10 percent by weight sodium carbonate (0.01 mole of sodium carbonate). The temperature of the reaction mixture was raised with stirring to 95° C. to start a reaction.

The reaction was ended by cooling the reaction solution when the viscosity of the reaction mixture became $4.0 \times 10^{-2}$ Pa·s (40 cP). Separately, a dispersion of oil-soluble dye was prepared by adding and thoroughly dispersing 50 g of an oil-soluble dye (Fluorescent Red 632, the product of Arimoto Chemical Co., Ltd.) in an aqueous solution dissolving 0.5 g of a dispersion auxiliary agent (product name EMULGEN 920, provided by Kao Corporation) in 70 g of pure water. The dispersion so prepared was added to the reaction solution and the mixture was stirred. The result was a colored reaction solution that contained an amino resin precursor, which is the initial condensate of benzoguanamine and formaldehyde.

Then, an aqueous solution dissolving 100 g of polyvinyl alcohol (product name PVA 205, provided by Kuraray Co., Ltd.) as an emulsion in 5150 g of water was charged in a 20 L reactor equipped with a reflux condenser, a homomixer (stirrer, provided by Tokushu Kika Kogyo Co., Ltd.), and a thermometer, etc. The temperature of the mixture was raised to 75° C. with stirring. After adding the reaction solution to the reactor, the temperature of the reaction mixture was raised to 77° C. and the content was vigorously stirred at 7000 rpm at a maintained temperature of 77° C., so as to emulsify the amino resin precursor and obtain a pink emulsion that contained the amino resin precursor in a concentration of 38.3 percent by weight. A measurement of the emulsion with the multisizer (Coulter Multisizer II, the product of Coulter Inc.) showed that the amino resin precursor in the emulsion had an average particle size (d50) of 3.5 μm and a standard deviation of 0.62 μm. To the reactor was then added, as a water dispersion of silica provided as an inorganic compound, 3000 g of AEROSIL 200 (provided by Japan Aerosil) with a solid concentration of 10 percent by weight. Thereafter, the content was stirred with the homomixer for 5 minutes at 4000 rpm at a maintained temperature of 77° C. The resulting emulsion was cooled to 30° C.

Then an aqueous solution dissolving 42 g of concentrated sulfuric acid as a catalyst in 1200 g of pure water was added to the emulsion (at a content temperature 30° C.), and the temperature of the reaction mixture was raised with stirring to 90° C. at 10° C./hr. The reaction mixture was maintained at 90° C. for an hour to condense and cure the amino resin precursor (curing step). Thus, the total reaction time was 7 hours.

After the curing step, the suspension containing amino resin particles was cooled to 30° C., and the pH of the suspension was adjusted to 7.1, using a 5 percent by weight sodium hydroxide aqueous solution (neutralizing step). After the neutralizing step, the colored amino resin particles according to the present invention were separated from the suspension by filtration. The amino resin particles thus separated was heated for 5 hours at 150° C. (heating step) and gently crushed with a pestle in a mortar. The result was a pink powder of amino resin crosslinked particles.

Figure 3:
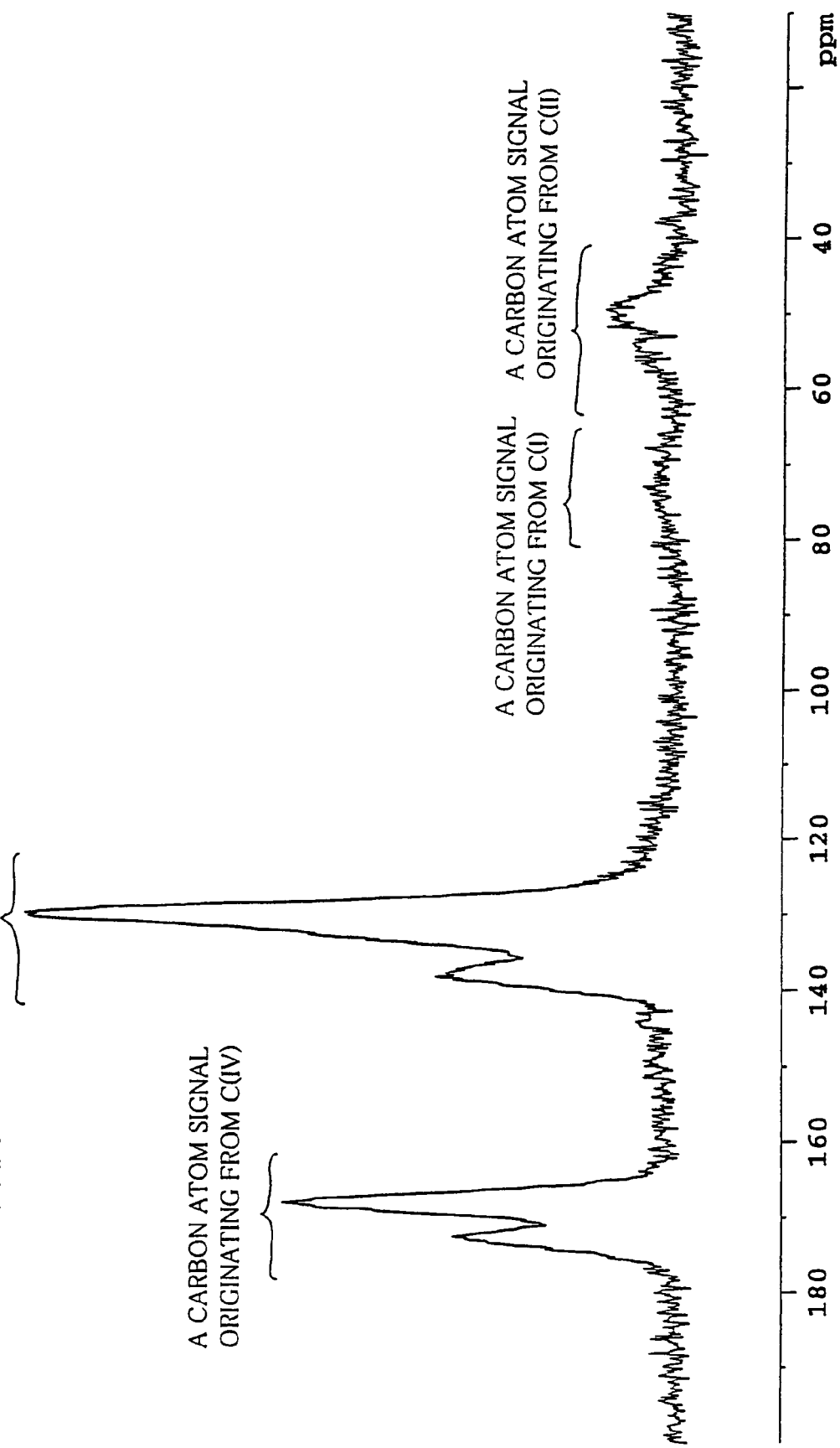
FIG. 3 is a solid-state $^{13}$C-NMR analysis spectrum of amino resin crosslinked particles of Example 4.

Measurements of the amino resin crosslinked particles with the multisizer showed that the amino resin crosslinked particles had an average particle size (d50) of 3.7 μm and a standard deviation of 0.99 μm. The amino resin crosslinked particles were then placed for a solid-state $^{13}$C-NMR analysis, so as to measure heat discoloring, solvent resistance, light resistance, and an amount of HCHO generated in a pyrolysis test. In addition, odor was confirmed. The main reaction conditions and results are summarized in Table 2. The results of solid-state $^{13}$C-NMR analysis on the amino resin crosslinked particles are shown in FIG. 3.

Example 5

A dispersion of oil-soluble dye was prepared by adding and thoroughly dispersing 50 g of an oil-soluble dye (Fluorescent Yellow 600, the product of Arimoto Chemical Co., Ltd.) in an aqueous solution dissolving 0.5 g of a dispersion auxiliary agent (product name EMULGEN 920, provided by Kao Corporation) in 100 g of pure water. Then, a reaction step, a coloring step, and an emulsifying step were carried out as in Example 4, except that the dispersion was added to the reaction solution in the coloring step, so as to obtain a yellow emulsion that contained an amino resin precursor in a concentration of 38. 3 percent by weight. The amino resin precursor in the emulsion had an average particle size (d50) of 4.0 μm and a standard deviation of 1.19 μm. The emulsion was cooled to 30° C. To the reactor was then added, as a water dispersion of silica provided as an inorganic compound, 3000 g of AEROSIL 200 (provided by Japan Aerosil) with a solid concentration of 10 percent by weight. Thereafter, the content was stirred with the homomixer for 5 minutes at 4000 rpm. The emulsion was used in the subsequent steps, including the curing step and the neutralizing step, as in Example 4. Amino resin particles were then separated from the reaction solution by filtration. Thereafter, a heating step (heat treatment) was carried out for 5 hours at 150° C. as in Example 4. The result was amino resin crosslinked particles of a yellow powdery form.

The amino resin crosslinked particles had an average particle size 4.1 μm and a standard deviation 1.30 μm. The same measurement and confirmation were carried out as in Example 4. The main reaction conditions and results are summarized in Table 2.

Example 6

Amino resin crosslinked particles of a yellow powdery form were obtained by the method of Example 5, except that the heating step was carried out in an atmosphere of nitrogen (oxygen concentration of 7 percent by volume). The product amino resin crosslinked particles had a color difference ($\Delta E^*_{ab}$) of 6.0 in a heat resistance test. The value of $\Delta b$ was 4.5. The main reaction conditions and results are shown in FIG. 2.

Comparative Example 3

A reaction step and an emulsifying step were carried out as in Example 4, so as to obtain a pink emulsion that contained an amino resin precursor in a concentration of 38.3 percent by weight. The amino resin precursor in the emulsion had an average particle size 3.6 μm and a standard deviation 1.02 μm. After adding a water dispersion of silica as in Example 4, the emulsion was cooled to 30° C. Then, a curing step was carried out as in Example 4. Amino resin particles were then separated from the suspension by filtration, without carrying out the neutralizing step. The amino resin particles so separated were heated for 5 hours at 150° C. and gently crushed with a pestle in a mortar. As a result, comparative amino resin crosslinked particles of a pink powdery form were obtained. That is, in this Comparative Example 3, the neutralizing step was not carried out.

The comparative amino resin crosslinked particles had an average particle size 3.8 μm and a standard deviation 1.40 μm. The same measurement and confirmation were carried out as in Example 4. The main reaction conditions and results are summarized in Table 2.

Comparative Example 4

A reaction step and an emulsifying step were carried out as in Example 5, so as to obtain a yellow emulsion that contained an amino resin precursor in a concentration of 38.3 percent by weight. The amino resin precursor in the emulsion had an average particle size 3.9 μm and a standard deviation 1.15 μm. After cooling the emulsion to 30° C., a water dispersion of silica was added as in Example 5.

The emulsion was used to carry out a curing step as in Example 4, except that 170 g of DBS (dodecylbenzenesulfonic acid) was used. Then, amino resin particles were separated from the suspension by filtration, without carrying out the neutralizing step. The amino resin particles so separated were then heated for 5 hours at 150° C. and gently crushed with a pestle in a mortar. As a result, comparative amino resin crosslinked particles of a yellow powdery form were obtained. That is, in this Comparative Example 4, the neutralizing step and the heat treatment step of a relatively high temperature (130° C. to 230° C.) were not carried out.

The comparative amino resin crosslinked particles had an average particle size (d50) 4.0 μm and a standard deviation 1.35 μm, as given by a multisizer. The same measurement and confirmation were carried out as in Example 4. The main reaction conditions and results are summarized in Table 2.

TABLE 2

| | EXAMPLE 4 | EXAMPLE 5 | EXAMPLE 6 | COMPARATIVE EXAMPLE 3 | COMPARATIVE EXAMPLE 4 |
|---|---|---|---|---|---|
| MONOMER | PINK BG | YELLOW BG | YELLOW BG | PINK BG | YELLOW BG |
| RESIN TEMPERATURE (° C.) | 95 | 96 | 95 | 95 | 95 |
| VISCOSITY OP REACTION SOLUTION AFTER REACTION ($\times 10^{-2}$ Pa·s) | 4.0 | 4.0 | 4.0 | 4.0 | 4.0 |
| PVA (g/BG 100 g) | 3 | 3 | 3 | 3 | 3 |
| TEMPERATURE OF EMULSIFICATION (° C.) | 75 | 75 | 75 | 75 | 75 |
| CONCENTRATION OF EMULSIFICATION (WT %) | 38 | 38 | 38 | 38 | 38 |
| AVERAGE PARTICLE SIZE AFTER EMULSIFICATION d50 (μm) | 3.5 | 4.0 | 3.5 | 3.6 | 3.9 |
| STANDARD DEVIATION OF PARTICLES AFTER EMULSIFICATION (μm) | 0.62 | 1.19 | 0.62 | 1.02 | 1.15 |
| CURING CATALYST | SULFURIC ACID | SULFURIC ACID | SULFURIC ACID | SULFURIC ACID | DBS |
| AMOUNT OF CATALYST ADDED (WT %) | 1.3 | 1.3 | 1.3 | 1.3 | 5.7 |
| pH OK SUSPENSION AFTER NEUTRALIZATION | 7.1 | 7.1 | 7.1 | 3.1 | 3.0 |
| HEATING TEMPERATURE (° C.) | 150 | 150 | 150 | 150 | 100 |
| DRYING TIME (h) | 5 | 5 | 5 | 5 | 5 |
| AVERAGE PARTICLE SIZE AFTER PULVERIZATION (μm) | 3.7 | 4.1 | 3.7 | 3.8 | 4.0 |

TABLE 2-continued

|  | EXAMPLE 4 | EXAMPLE 5 | EXAMPLE 6 | COMPARATIVE EXAMPLE 3 | COMPARATIVE EXAMPLE 4 |
|---|---|---|---|---|---|
| STANDARD DEVIATION OF PARTICLES AFTER PULVERIZATION (μm) | 0.99 | 1.30 | 0.99 | 1.30 | 1.35 |
| NMR AREA RATIO |  |  |  |  |  |
| C(II)/C(I) | 3.76 | 3.55 | 3.76 | 3.75 | 1.02 |
| C(II)/C(III) | 0.12 | 0.13 | 0.12 | 0.12 | 0.06 |
| C(II)/C(IV) | 0.26 | 0.24 | 0.26 | 0.25 | 0.13 |
| COLOR DIFFERENCE VALUE ($\Delta E^*_{ab}$) | 3.1 | 7.7 | 6.0 | 17.5 | 20.1 |
| $\Delta b^*$ VALUE | 1.6 | 6.0 | 4.5 | 11.5 | 14.0 |
| SOLVENT RESISTANCE | ○ | ○ | ○ | ○ | x |
| LIGHT RESISTANCE | ○ | ○ | ○ | ○ | x |
| AMOUNT OF HCHO GENERATED (ppm) | NOT DETECTED | NOT DETECTED | NOT DETECTED | NOT DETECTED | 14000 |
| ODOR | VERY WEAK | VERY WEAK | VERY WEAK | VERY WEAK | STRONG |

Note that, in Table 2, "BG" and "PVA" indicate benzoguanamine and polyvinyl alcohol, respectively. The unit of PVA is gram per 100 g of benzoguanamine.

As is clear from the results in Table 2, by the neutralizing step for neutralizing the suspension that contains amino resin particles and by the subsequent heating step for heating the amino resin crosslinked particles in a temperature range of 130° C. to 230° C., it is possible to obtain amino resin crosslinked particles that have a color difference of not more than 15 in a heat discoloring test and that generate formaldehyde in an amount of not more than 1000 ppm in a pyrolysis test. The amino resin crosslinked particles that were produced without the neutralizing step have a color difference greater than 15 in a heat discoloring test, i.e., the amino resin crosslinked particles discolored. Table 2 also shows that the amino resin crosslinked particles that were heated at a temperature below 130° C. generate formaldehyde in a pyrolysis test and have poor solvent resistance.

The following Examples 7 through 9 are based on a process that comprises the steps of (1) adding a catalyst to an emulsion of an amino resin precursor, which is the product of a reaction of an amino compound with formaldehyde, in an aqueous solution of a surfactant, so as to cure the amino resin precursor and obtain amino resin particles; and (2) heating the amino resin particles in an atmosphere of inert gas that contains oxygen in a concentration of not more than 10 percent by volume and in a temperature range of 130° C. to 230° C. That is, the following Examples 7 through 9 do not limit the present invention in any ways. In other words, the following Examples 7 through 9 and Comparative Example 5 correspond to the Third Embodiment of the present invention.

Example 7

A four-neck flask equipped with a stirrer, a reflux condenser, and thermometer was charged with 150 parts of melamine, 290 parts by weight of formalin in a concentration of 37 percent by weight, and 1.5 parts of ammonium water in a concentration of 28 percent by weight, so as to prepare a reaction mixture. The pH of the system was adjusted to 8.0. The temperature of the reaction mixture was raised to 70° C. with stirring and a reaction was allowed for 30 minutes at this temperature, so as to obtain an initial condensate with miscibility with water∞percent.

Separately, 12 parts by weight of an anionic surfactant (NEOPELEX No. 6F powder (the product of Kao Corporation, sodium dodecylbenzenesulfonate) was dissolved in 2240 parts by weight of water. The aqueous solution of the surfactant was stirred at an increased temperature of 90° C. Then, the initial condensate was placed in the aqueous solution of the surfactant being stirred. Additionally, 75 parts by weight of an aqueous solution of 10 percent by weight dodecylbenzenesulfonic acid was added. Then, the temperature of the reaction mixture was gradually raised to 90° C. The reaction mixture was maintained for 2 hours at this temperature so as to obtain a suspension of cured resin by condensation and curing. Observing the suspension under a light microscope (800 times magnification) showed that the particles were spheres with a particle size of about 0.5 μm. Active Brownian motion of the particles was also observed.

The suspension was cooled to 30° C. and the pH thereof was adjusted to 7.0 using a 5 percent by weight sodium hydroxide aqueous solution. After adding 200 parts by weight of a 1 part by weight aluminum sulfate aqueous solution, the emulsion was placed for suction filtration and solid-liquid separation. The cured resin so separated was then dried by heating for 2 hours using a hot-air drier at 160° C. (heat treatment step) in an atmosphere of nitrogen (oxygen concentration of 0.5 percent by volume), so as to obtain an agglomerate of 183 parts by weight cured resin spherical particles. The agglomerate was then crushed using a ball mill to obtain cured resin spherical particles of a white color (amino resin crosslinked particles). Observing the cured resin spherical particles under a scanning electron microscope showed that the particles were uniform spheres with an average particle size of 0.5 μm. The cured resin spherical particles had a Hunter whiteness of 94 percent. The results are shown in Table 3.

Example 8

A four-neck flask equipped with a stirrer, a reflux condenser, and thermometer was charged with 75 parts of melamine, 75 parts by weight of benzoguanamine, 290 parts by weight of formalin in a concentration of 37 percent by weight, and 1.5 parts of a sodium carbonate aqueous solution in a concentration of 10 percent by weight, so as to prepare a reaction mixture. The pH of the system was adjusted to 8.0. The temperature of the reaction mixture was raised to 85° C. with stirring and a reaction was allowed for 1.5 hours at this temperature, so as to obtain an initial condensate with miscibility with water 200 percent.

Separately, 7.5 parts by weight of a nonionic surfactant (EMULGEN 430 (the product of Kao Corporation, polyoxyethyleneoleilether) was dissolved in 2455 parts by weight of water. The aqueous solution of the surfactant was stirred at an increased temperature of 50° C. Then, the initial condensate was placed in the aqueous solution of the surfactant being stirred, so as to obtain an emulsion of the initial condensate. To the emulsion was added 90 parts by weight of an aqueous solution of 5 percent by weight dodecylbenzeneslfonic acid. The reaction mixture was then maintained for 3 hours n a temperature range of 50° C. to 60° C., so as to obtain an emulsion of cured resin. The emulsion was rapidly cooled in 3000 parts by weight of cold water. Observing the emulsion so cooled under a light microscope (600 times magnification) showed that the particles were highly uniform spheres with an average particle size of about 8 μm.

Then, a paste obtained by precipitation separation of the cured resin from the emulsion was dissolved in 2000 parts by weight of water, together with EMULGEN 430 (7.5 parts by weight) and 4.5 parts by weight of dodecylbenzenesulfonic acid. The cured resin was then dispersed in the aqueous solution using a ultrasonic dispersing device. The temperature of the cured resin so dispersed was then gradually increased to 90° C. with stirring and maintained at this temperature for an hour, so as to completely cure the cured resin. As a result, a suspension of sufficiently cured resin was obtained. The cured resin was separated from the suspension by centrifugal separation and dried by heating for 4 hours with a hot-air drier at 150° C. (heat treatment step) in an atmosphere of nitrogen (oxygen concentration of 2 percent by volume), so as to obtain an agglomerate of 120 parts by weight cured resin spherical particles. The agglomerate was then crushed with a ball mill to obtain amino resin crosslinked particles of a white color (cured resin spherical particles). Measuring the amino resin crosslinked particles with a particle distribution measuring device (Coulter Counter Model TA-II, C-1000, the product of Coulter Electronics, Inc.) showed that the amino resin crosslinked particles had a notably narrow particle distribution with an average particle size 8.0 μm and a standard deviation 0.5 μm. Observing the amino resin crosslinked particles under a scanning electron microscope showed that the particles were spheres with an average particle size of about 8 μm. Further, the amino resin crosslinked particles had a Hunter whiteness of 90 percent. The results are shown in Table 3.

Example 9

White amino resin crosslinked particles were obtained by the method of Example 1, except that the neutralizing step, which was carried out in Example 7, was not carried out in this Example. That is, in this Example 9, a heating step was carried out in an atmosphere of nitrogen. The amino resin crosslinked particles had a Hunter whiteness of 89 percent. The results are shown in Table 3.

Example 10

White powdery amino resin crosslinked particles were obtained by the method of Example 1, except that the neutralizing step using 5 percent by weight sodium hydroxide after the curing step was not carried out, and the heating step was carried out in an atmosphere of nitrogen (oxygen concentration of 3 percent by volume). The amino resin crosslinked particles had a Hunter whiteness of 89 percent. The results are shown in Table 3.

Comparative Example 5

White amino resin crosslinked particles were obtained by the method of Example 7, except that the heating step (heat treatment step) was carried out in an atmosphere of air, instead of nitrogen, and the neutralizing step using an aqueous solution of 5 percent by weight sodium hydroxide was not carried out. That is, in this Comparative Example, the neutralizing step and the heating step (heat treatment step) in an atmosphere of inert gas were not carried out. The amino resin crosslinked particles had a Hunter whiteness of 82 percent. The results are shown in Table 3.

TABLE 3

|  | EXAMPLE 7 | EXAMPLE 8 | EXAMPLE 9 | EXAMPLE 10 | COMPARATIVE EXAMPLE 5 |
|---|---|---|---|---|---|
| NMR AREA RATIO |  |  |  |  |  |
| C(II)/C(I) | 3.95 | 3.80 | 3.95 | 3.86 | 3.95 |
| C(II)/C(IV) | 0.32 | 0.35 | 0.32 | 0.25 | 0.32 |
| HUNTER WHITENESS (%) | 94 | 90 | 89 | 89 | 82 |
| HUNTER WHITENESS AFTER HEAT RESISTANCE TEST (%) | 92 | 86 | 86 | 86 | 65 |
| SOLVENT RESISTANCE | ○ | ○ | ○ | ○ | ○ |
| LIGHT RESISTANCE | ○ | ○ | ○ | ○ | ○ |
| AMOUNT OF HCHO GENERATED (ppm) | NOT DETECTED | NOT DETECTED | NOT DETECTED | NOT DETECTED | NOT DETECTED |
| ODOR | VERY WEAK | VERY WEAK | VERY WEAK | VERY WEAK | VERY WEAK |

As is clear from the results shown in Table 3, by carrying out the heating step in an atmosphere of inert gas, discoloring of the amino resin crosslinked particles can be suppressed. Further, by carrying out the neutralizing step in combination with the heating step (heat treatment step) in an atmosphere of inert gas, discoloring of the amino resin crosslinked particles can be suppressed more effectively.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A producing process of amino resin crosslinked particles, comprising the steps of:
   (1) adding a catalyst to an emulsion of an amino resin precursor that is obtained as an initial condensate by a reaction of an amino compound with formaldehyde, the emulsion being a mixture of a reaction solution containing the amino resin precursor with an aqueous solution of an emulsifier and/or a surfactant the reaction solution containing the amino resin precursor having a viscosity of $2\times10^{-2}$ Pa·s to $5.5\times10^{-2}$ Pa·s (20 cP to 55 cP) in a temperature range of 95° C. to 98° C., so as to cure the amino resin precursor in an emulsion state to prepare a suspension that contains amino resin particles;

(2) neutralizing the suspension that contains the amino resin particles obtained in said step (1); and (3) separating the amino resin particles from the suspension after said step (2) and then heating the amino resin particles in a temperature range of 130° C. to 230° C., the suspension containing the amino resin particles being adjusted in said step (2) from a pH of 1.5 to 3 to a pH of not less than 5.

2. The process as set forth in claim 1, wherein said step (3) is carried out in an atmosphere of inert gas that contains oxygen in a concentration of not more than 10 percent by volume.

3. The process as set forth in claim 1, wherein said step (1) comprises a step of coloring the amino resin precursor with a dye and/or a pigment.

4. The process as set forth in claim 3, wherein the dye is a fluorescent dye and the pigment is a fluorescent pigment.

5. A producing process of amino resin crosslinked particles, comprising the steps of:
   (1) adding a catalyst to an emulsion of an amino resin precursor that is obtained by a reaction of an amino compound with formaldehyde, the emulsion being a mixture of a reaction solution containing the amino resin precursor with an aqueous solution of an emulsifier and/or a surfactant, so as to cure the amino resin precursor in an emulsion state to prepare a suspension that contains amino resin particles; and
   (2) heating the amino resin particles in an atmosphere of inert gas that contains oxygen in a concentration of not more than 10 percent by volume and in a temperature range of 130° C. to 230° C.

6. The process as set forth in claim 5, wherein said step (1) comprises a step of coloring the amino resin precursor with a dye and/or a pigment.

7. The process as set forth in claim 6, wherein the dye is a fluorescent dye and the pigment is a fluorescent pigment.

8. A producing process of amino resin crosslinked particles, comprising the steps of:
   (1) adding a catalyst to an emulsion of an amino resin precursor that is obtained by a reaction of an amino compound with formaldehyde, the emulsion being a mixture of a reaction solution containing the amino resin precursor with an aqueous solution of an emulsifier and/or a surfactant, so as to cure the amino resin precursor in an emulsion state to prepare a suspension that contains amino resin particles;
   (2) neutralizing the suspension that contains the amino resin particles obtained in said step (1); and
   (3) separating the amino resin particles from the suspension after said step (2) in an atmosphere of inert gas that contains oxygen in a concentration of not more than 10 percent by volume and then heating the amino resin particles in a temperature range of 130° C. to 230° C., the suspension containing the amino resin particles being adjusted in said step (2) from a pH of 1.5 to 3 to a pH of not less than 5.

* * * * *